United States Patent
Tsuboi

(10) Patent No.: US 9,516,181 B2
(45) Date of Patent: Dec. 6, 2016

(54) OUTPUT SETTING DEVICE AND COMPUTER-READABLE STORAGE MEDIUM FOR COMPUTER PROGRAM

(71) Applicant: KONICA MINOLTA, INC., Chiyoda-ky (JP)

(72) Inventor: Tomo Tsuboi, Itami (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/294,222

(22) Filed: Jun. 3, 2014

(65) Prior Publication Data

US 2014/0362402 A1 Dec. 11, 2014

(30) Foreign Application Priority Data

Jun. 10, 2013 (JP) .................................. 2013-121472

(51) Int. Cl.
G06F 3/12 (2006.01)
H04N 1/00 (2006.01)

(52) U.S. Cl.
CPC ...... *H04N 1/00411* (2013.01); *H04N 1/00456* (2013.01); *H04N 1/00482* (2013.01)

(58) Field of Classification Search
None
See application file for complete search history.

(56) References Cited

U.S. PATENT DOCUMENTS

| | | | |
|---|---|---|---|
| 2008/0084399 A1* | 4/2008 | Chua et al. | 345/173 |
| 2008/0232835 A1* | 9/2008 | Ota et al. | 399/45 |
| 2010/0220356 A1* | 9/2010 | Hamada et al. | 358/1.15 |
| 2011/0128247 A1 | 6/2011 | Sensu | |
| 2011/0199629 A1* | 8/2011 | Sensu et al. | 358/1.13 |

(Continued)

FOREIGN PATENT DOCUMENTS

| | | |
|---|---|---|
| JP | 10-193735 A | 7/1998 |
| JP | 2006-067018 A | 3/2006 |

(Continued)

OTHER PUBLICATIONS

Office Action (Notification of Reason(s) for Refusal) issued on Jan. 27, 2015, by the Japanese Patent Office in corresponding Japanese Patent Application No. 2013-121472 and an English Translation of the Office Action. (26 pages).

*Primary Examiner* — Huo Long Chen
(74) *Attorney, Agent, or Firm* — Buchanan Ingersoll & Rooney PC

(57) ABSTRACT

An output setting device for setting a scale ratio for image size change when an image is reduced or enlarged to be placed in an output page is provided. The device includes a touch-sensitive panel capable of detecting a multi-touch; and a setting portion setting, when a multi-touch gesture for giving a command to change the image size is made on the touch-sensitive panel, as the scale ratio for image size change, a scale ratio closest to a present scale ratio from among scale ratios available when the image is reduced or enlarged in accordance with the multi-touch gesture in such a manner that at least one of a vertical dimension and a horizontal dimension of the image size is made equal to any one of a vertical dimension and a horizontal dimension of any one of standard sizes with an aspect ratio of the image remaining unchanged.

18 Claims, 25 Drawing Sheets

(56) References Cited

U.S. PATENT DOCUMENTS

2013/0057891 A1* 3/2013 Aoki .................. H04N 1/387
                                                           358/1.13
2013/0155423 A1* 6/2013 Shibata .................. 358/1.2

FOREIGN PATENT DOCUMENTS

| JP | 2007-150698 A   |   | 6/2007 |
|----|-----------------|---|--------|
| JP | 2012-121179 A   |   | 6/2012 |
| JP | 2012-123066 A   |   | 6/2012 |
| JP | 2012123066 A    | * | 6/2012 |
| JP | 2013-018234 A   |   | 1/2013 |
| JP | 2013-051000 A   |   | 3/2013 |

* cited by examiner

FIG. 4

| PAPER FEEDING PORTION | SIZE OF LOADED PAPER | PAPER ORIENTATION |
|---|---|---|
| FIRST PAPER CASSETTE (45) | A4 | LANDSCAPE ORIENTATION (Y) |
| SECOND PAPER CASSETTE (46) | B5 | LANDSCAPE ORIENTATION (Y) |
| THIRD PAPER CASSETTE (47) | B4 | PORTRAIT ORIENTATION (T) |
| FOURTH PAPER CASSETTE (48) | A3 | PORTRAIT ORIENTATION (T) |
| MANUAL PAPER FEEDER (49) | N/A | — |

FIG. 7A

| T1 | PAPER SIZE TABLE (JAPAN) |
|---|---|
| | A5: 148 × 210mm |
| | B5: 182 × 257mm |
| | A4: 210 × 297mm |
| | B4: 257 × 364mm |
| | A3: 297 × 420mm |

FIG. 7B

| T1b | PAPER SIZE TABLE (NORTH AMERICA) |
|---|---|
| | Invoice : 8.3 × 11inch (210.8 × 279.4mm) |
| | Letter : 8.5 × 11inch(215.9 × 279.4mm) |
| | Legal  : 8.5 × 14inch(215.9 × 355.6mm) |

FIG. 7C

| T1c | PAPER SIZE TABLE (EUROPE) |
|---|---|
| | A5: 148 × 210mm |
| | A4: 210 × 297mm |
| | A3: 297 × 420mm |

(A) OUTPUT SIZE: A4 (LANDSCAPE)

⇩ PINCH-IN (B) OUTPUT SIZE: A4 (LANDSCAPE)

⇩ PINCH-IN (C) OUTPUT SIZE: A4 (LANDSCAPE)

⇩ PINCH-IN (D) OUTPUT SIZE: B5 (LANDSCAPE)

(A) OUTPUT SIZE: A4 (LANDSCAPE)

⇩ PINCH-OUT (B) OUTPUT SIZE: A4 (LANDSCAPE)

⇩ PINCH-OUT (C) OUTPUT SIZE: A4 (PORTRAIT)

⇩ PINCH-OUT (D) OUTPUT SIZE: B4 (LANDSCAPE)

(A)

OUTPUT SIZE: A4
(LANDSCAPE)

PAGE1
PAGE2
PAGE3
PAGE4

ROTATE (B)

OUTPUT SIZE: A4
(LANDSCAPE)

PAGE1　PAGE2

FIG. 23

| Tm — REGISTERED SCALE RATIO TABLE |
|---|
| 25% |
| 50% |
| 75% |
| 100% |
| 125% |
| 150% |
| 175% |
| 200% |

OUTPUT SETTING DEVICE AND COMPUTER-READABLE STORAGE MEDIUM FOR COMPUTER PROGRAM

This application is based on Japanese patent application No. 2013-121472 filed on Jun. 10, 2013, the contents of which are hereby incorporated by reference.

BACKGROUND OF THE INVENTION

1. Field of the Invention

The present invention relates to settings for image output operation of printing an image, or sending an image in the form of image data for example.

2. Description of the Related Art

Information devices having increased functions such as Multi-functional Peripherals (MFPs) are provided with a touch-sensitive panel as an input means. This enables a variety of operations with operating screens switched between each other. The touch-sensitive panel herein is a touchpad pointing device to be placed on a display in use, such as a liquid crystal display. The surface of the touch-sensitive panel functions both as a screen on which an image of an operating screen is displayed and as a touch-sensitive surface on which a user performs operation.

The touch-sensitive panel is also used as an input means of a mobile information device. In particular, a project-type capacitive touch-sensitive panel is used in a smartphone and a tablet personal computer. The use of this type of touch-sensitive panel enables a user to make a well-known single touch gesture such as tap or flick, and to make a multi-touch gesture of touching the touch-sensitive surface with a plurality of fingers at the same time.

Examples of the multi-touch gesture are: "pinch-in" of touching the touch-sensitive surface with two fingers and bringing them closer together; "pinch-out" of touching the touch-sensitive surface with two fingers and moving them apart; and "rotate" of touching the touch-sensitive surface with two fingers and sliding one fingertip or two fingertips to change the direction of a segment line connecting to both the fingertips. In general, pinch-in is regarded as an operation to reduce a displayed image, pinch-out is regarded as an operation to enlarge a displayed image, and rotate is regarded as operation to change an image orientation.

There has been proposed to provide, in an image forming apparatus for outputting an image by printing onto paper, a user interface through which print magnification is set in accordance with a multi-touch gesture. A technology has been disclosed which allows a user to easily designate, through pinch-in and pinch-out, a magnification suitable for printing onto paper having a standard size (Japanese Laid-open Patent Publication Nos. 2012-123066 and 2012-121179).

According to the image forming apparatus described in English abstract of the former publication, when pinch-in is performed during a print preview, a size-changing ratio is reduced gradually. When the size-changing ratio reaches a size-changing ratio suitable for a predetermined standard size, the size-changing ratio is maintained regardless of the pinch-in. When pinch-out is performed, the size-changing ratio is increased gradually, and the size-changing ratio suitable for the standard size is maintained. This enables a user to cause an image to be printed at the size-changing ratio suitable for paper having the standard size without adjusting precisely a distance between user's fingers.

According to the image forming apparatus described in English abstract of the latter publication, when quick pinch-in in which a moving speed between two points designated by a touch is equal to or more than a threshold is made during a print preview, instead of the current scale ratio, a scale ratio smaller than the current scale ratio and suitable for the predetermined standard size is set. When quick pinch-out is made, instead of the current scale ratio, a scale ratio larger than the current scale ratio and suitable for a predetermined standard size is set. The latter publication discloses that the repetition of quick operation makes it possible to enlarge or reduce an image step by step to match the standard size gradually set.

According to the technologies in the foregoing publications, the print magnification is gradually changed and set to fit into a larger standard size or into a smaller standard size in response to pinch-in or pinch-out. The number of settable magnifications is therefore limited to the number of standard sizes preset in stages. The number of standard sizes actually depends on which size of paper is loaded in the image forming apparatus. Accordingly, the number of settable magnifications is limited to the number of paper feed trays into which sheets of paper having different sizes are loaded, i.e., limited to the number of choices of paper size. For this reason, in particular, in the case of reducing or enlarging with the aspect ratio unchanged an image having an aspect ratio completely different from that of general standard paper, e.g., a Web page image which is not created based on the premise that it is printed out, in order to fit the image into paper with any one of the selectable sizes, it is necessary to reduce the image excessively in some cases, or, the image cannot be enlarged enough in other cases.

SUMMARY

The present disclosure has been achieved in light of such an issue, and therefore, an object of an embodiment of the present invention is to improve the convenience of a function to change an image size in accordance with a multi-touch gesture.

An output setting device according to an embodiment of the present invention is an output setting device for setting a scale ratio for image size change for a case where an image is reduced or enlarged to be placed in an output page. The device includes a touch-sensitive panel capable of detecting a multi-touch; and a setting portion configured to set, when a multi-touch gesture for giving a command to change an image size of the image is made on the touch-sensitive panel, as the scale ratio for image size change, a scale ratio closest to a present scale ratio from among scale ratios available for a case where the image is reduced or enlarged in accordance with the multi-touch gesture in such a manner that at least one of a vertical dimension and a horizontal dimension of the image size is made equal to any one of a vertical dimension and a horizontal dimension of any one of standard sizes with an aspect ratio of the image remaining unchanged.

These and other characteristics and objects of the present invention will become more apparent by the following descriptions of preferred embodiments with reference to drawings.

BRIEF DESCRIPTION OF THE DRAWINGS

FIG. 4 is a diagram showing an example of choices of paper size in an MFP.

FIGS. 7A-7C are diagrams showing examples of a paper size table.

FIG. 10 is a diagram showing an example of reduction in image size via pinch-in.

FIG. 23 is a diagram showing an example of a registered magnification table.

DESCRIPTION OF THE PREFERRED EMBODIMENTS

In this description, an MFP is taken as an example of a device outputting an image. The MFP is a composite information device usable as a copier, a printer, a network scanner, a facsimile machine, a document server, and so on.

Figure 1:
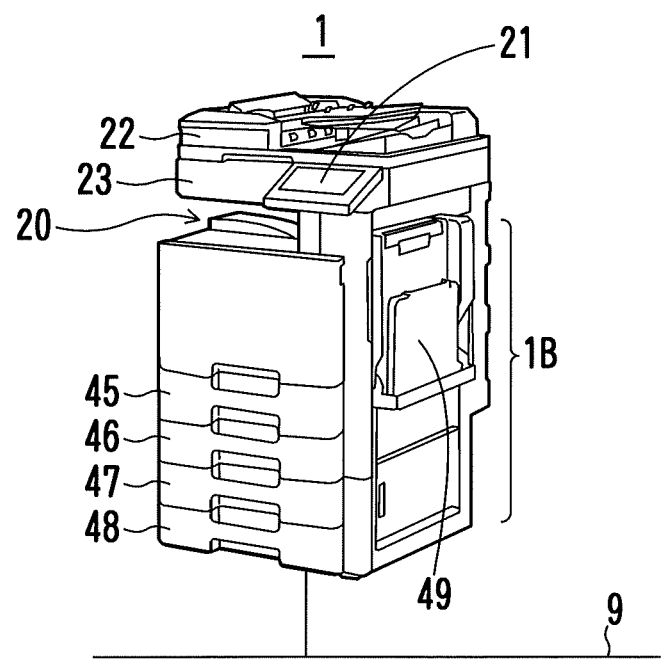
FIG. 1 is a perspective view showing an example of the appearance of an MFP according to an embodiment of the present invention.

Referring to FIG. 1, an MFP 1 has an outer shape of in-body paper discharge type and is installed in a space having a substantial rectangular column shape. The MFP 1 has, on its upper part, an in-body paper discharge space 20 in which sheets of printed paper are accumulated. Above the in-body paper discharge space 20, an image scanner 23 and an Auto Document Feeder (ADF) 22 are provided. Below the in-body paper discharge space 20, a printer portion 1B is provided. In the lower part of the printer portion 1B, four stages of pull-out paper cassettes 45, 46, 47, and 48 are provided. On the side of the housing of the printer portion 1B, a pivottable manual paper feeder 49 is provided.

In the MFP 1, an operating panel 21 is provided on the right part of the front face of the image scanner 23. The posture of the operating panel 21 can be adjusted manually in the horizontal direction and in the vertical direction as long as the operation-receiving surface faces obliquely upward.

Figure 2:
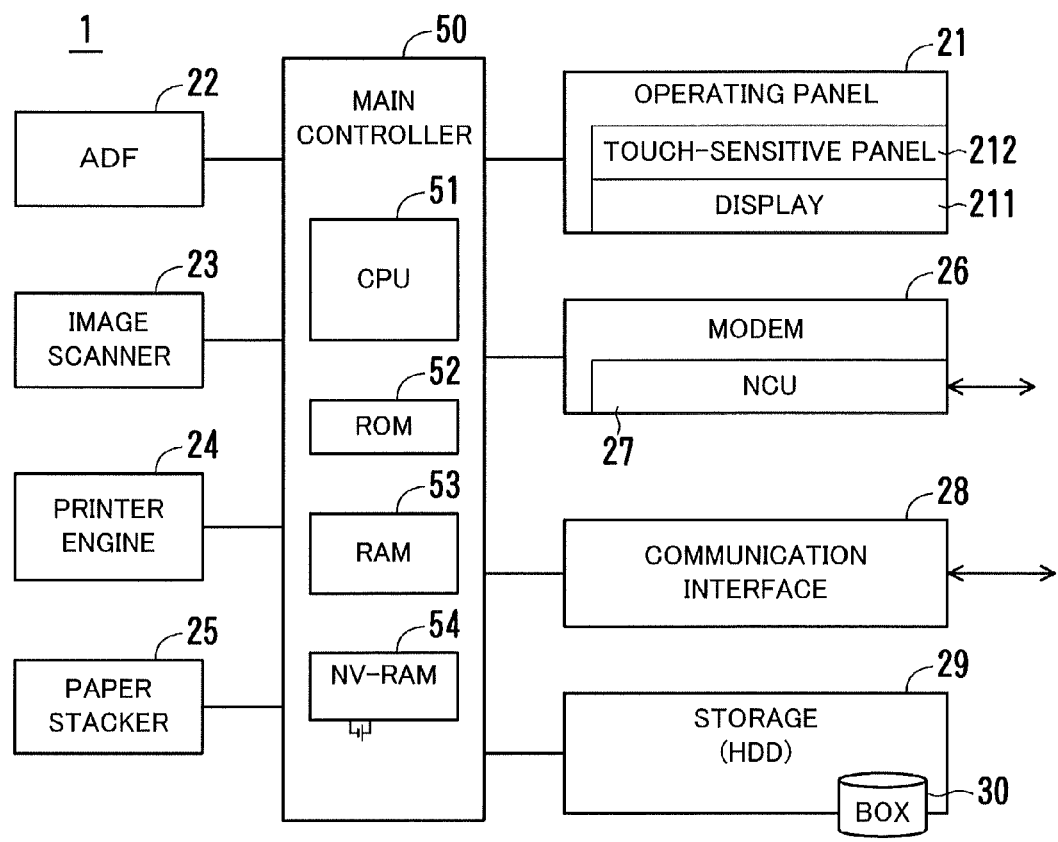
FIG. 2 is a diagram showing an example of the hardware configuration of an MFP.

Referring to FIG. 2, the operating panel 21 is provided with a display 211 and a touch-sensitive panel 212. The display 211 is operable to display an operating screen in accordance with a command from a main controller 50. The touch-sensitive panel 212 outputs a signal indicating a position, touched by a user, on a display surface of the display 211. The touch-sensitive panel 212 is a project-type capacitive pointing device having multi-touch capabilities.

In the case of copying, image input, or facsimile transmission, the ADF 22 feeds a document sheet to a scan position of the image scanner 23. The image scanner 23 optically reads an image recorded on the document sheet. The printer engine 24 is operable to print, through electrophotography, a monochrome or color image onto a single side or both sides of paper supplied from a multi-stage paper stacker 25.

The modem 26 and a Network Control Unit (NCU) 27 are used for facsimile communication via a public telephone line. A communication interface 28 connects the MFP 1 to a network 9 through which the MFP 1 performs communication with an external device. A storage 29 is a mass storage device such as a hard disk drive (HDD). The storage 29 is used as a medium for storing programs and data for control. The storage 29 has a box 30 which is a memory area to which a variety of documents are saved. The data and programs stored in the storage 29 are loaded, if necessary, into a work area where programs are executed.

The main controller 50 serves to control an overall operation of the MFP 1. The main controller 50 has a Central Processing Unit (CPU) 51 functioning as a computer for executing a control program and a variety of applications, a Read Only Memory (ROM) 52 for storing the control program therein, a Random Access Memory (RAM) 53 used as a work area for program execution, a battery-packed Non-Volatile memory (NV-RAM) 54 for storing therein setting data necessary for control, and so on.

Figure 3:
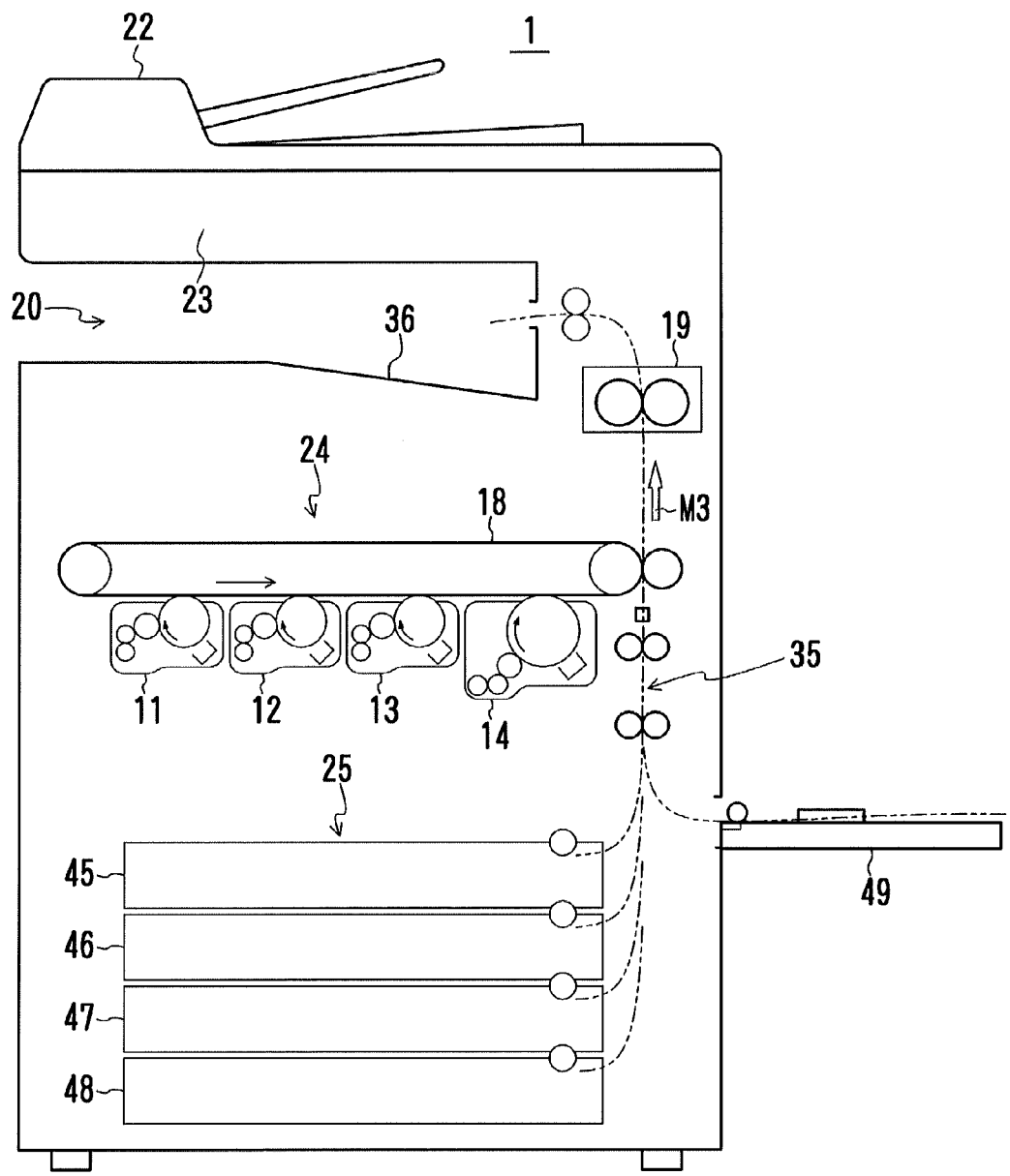
FIG. 3 is a diagram showing an example of an outline of a mechanism related to print operation by an MFP.

Referring to FIG. 3, the printer engine 24 of the MFP 1 is of a tandem type in which four imaging stations 11, 12, 13, and 14 are provided to form, in parallel, toner images for four colors of yellow (Y), magenta (M), cyan (C), and black (K). Each of the imaging stations 11, 12, 13, and 14 has a tubular photoconductor, an electrostatic charger, a developer unit, a cleaner, and so on, all of which are necessary to form toner images. For color printing, the total of four toner images formed by the imaging stations 11, 12, 13, and 14 are primarily transferred, in order, onto an intermediate transfer belt 18 which is an endless toner image carrier, and the resultants overlap each other on the intermediate transfer belt 18. For monochrome printing, a black toner image formed by the imaging station 14 is primarily transferred onto the intermediate transfer belt 18. The toner image on the intermediate transfer belt 18 is then transferred secondarily onto sheet (not shown in the drawing) fed from the paper stacker 25 along a path 35 shown by the chain double-dashed line of FIG. 3. After the secondary transfer, the paper passes through a fixing unit 19, and is delivered to a paper output tray 36.

The MFP 1 is provided with, as a paper supply source to the printer engine 24, the paper stacker 25 from which standard-sized sheets frequently used are supplied, and the manual paper feeder 49 from which less frequently-used sheets are supplied. The paper stacker 25 is formed of the paper cassettes 45, 46, 47, and 48 in each of which several hundred sheets can be loaded.

The size of sheets loadable into each of the paper cassettes 45, 46, 47, and 48 functioning as paper feeding portions can be changed. In some cases, a user loads sheets of paper having four different sizes into the four paper cassettes 45, 46, 47, and 48. In other cases, the user loads sheets of paper with the same size into two or more of the four paper cassettes 45, 46, 47, and 48. The size of sheets of paper loaded into the paper cassettes 45, 46, 47, and 48 is automatically detected, and managed in a paper cassettes table Tp as shown in FIG. 4.

In the example of FIG. 4, A4 size paper is loaded into the first paper cassette 45, and B5 size paper is loaded into the second paper cassette 46. Further, B4 size paper is loaded into the third paper cassette 47, and A3 size paper is loaded into the fourth paper cassette 48. No paper is loaded into the manual paper feeder 49. Accordingly, choices of the size of output page for printing, i.e., choices of paper size, are four standard sizes of B5, A4, B4, and A3 in order from the smallest to the largest. The output page means a region corresponding to a single side of a sheet of paper.

Figure 5:
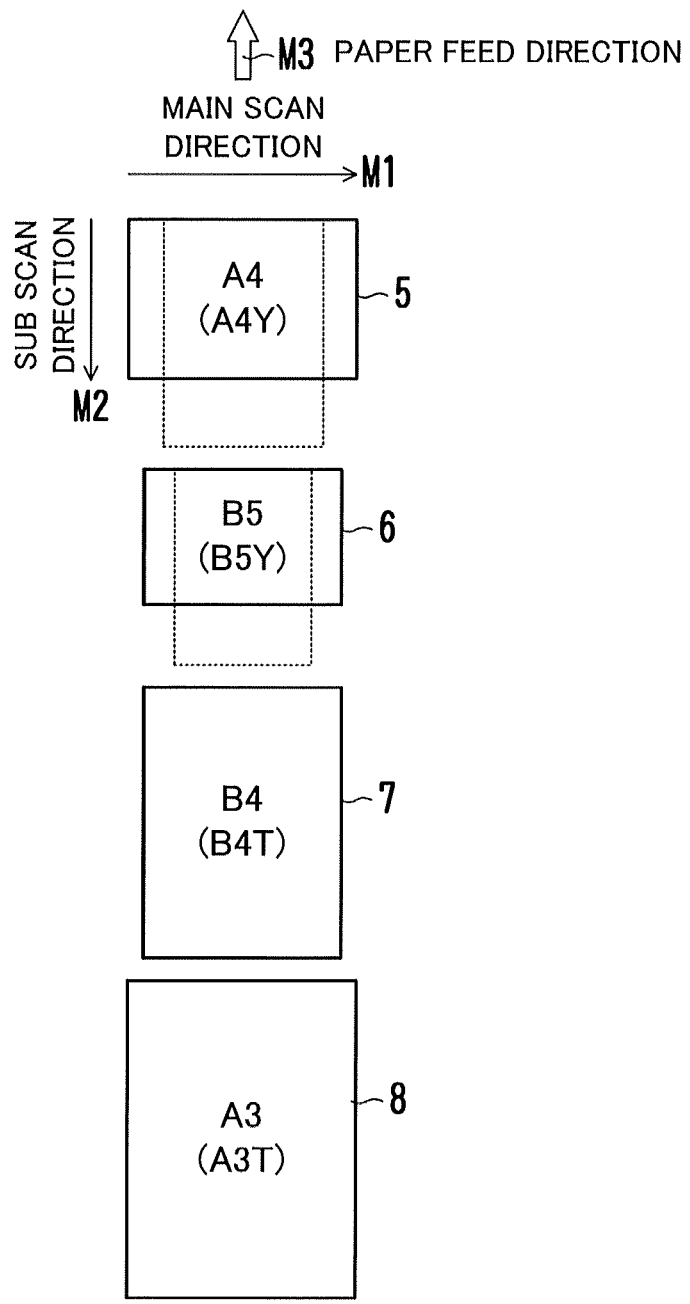
FIG. 5 is a diagram showing an example of paper orientation with respect to a paper feed direction.

Referring to FIG. 4, in the paper stacker 25, A4 size paper and B5 size paper are placed in landscape orientation (Y), and B4 size paper and the A3 size paper are placed in portrait orientation (T). As shown in FIG. 5, the landscape orientation for paper is an orientation in which the short sides of paper are parallel with the paper feed direction M3. The portrait orientation is an orientation in which the long sides of paper are parallel with the paper feed direction M3. In the case of landscape orientation, during a print process, the main scan direction in exposure to the photoconductor (rotational axis direction of the photoconductor) M1 is parallel with the long sides of paper, and the sub scan direction (rotary direction around a circumference of the photoconductor) M2 is parallel with the short sides of paper. On the other hand, in the case of portrait orientation, the main scan direction M1 is parallel with the short sides of paper, and the sub scan direction M2 is parallel with the long sides of paper.

The dimension of long side of A4 size paper is equal to the dimension of short side of A3 size paper. Therefore, as shown by the broken line of FIG. 5, it is possible to load A4 size paper 5 and B5 size paper 6 into the paper stacker 25 in portrait orientation. However, it is impossible to load B4 size paper 7 and A3 size paper 8 into the paper stacker 25 in landscape orientation because the width of a paper feed path is smaller than the dimension of long side of B4 size paper.

In the MFP 1, the orientation of an image to be printed (portrait orientation or landscape orientation) is not subjected to the restrictions of the paper orientation in the paper stacker 25. The portrait orientation is an orientation extending vertically, i.e., tall and narrow. The landscape orientation is an orientation extending horizontally, i.e., short and wide. This is because the MFP 1 has an image processing function to rotate an image by 90 degrees if necessary. To be specific, when an image in portrait mode is printed onto paper loaded in landscape orientation, or, alternatively, when an image in landscape mode is printed onto paper loaded in portrait orientation, the image can be rotated in such a manner that the image orientation conforms to the paper orientation. This means that the number of choices of magnification for the case of printing an image scaled (enlarged or reduced) to fit in paper becomes double of the number (four in this example) of choices of paper size.

The description goes onto a structure and operation related to scaling for the case where the MFP 1 outputs an image.

The image output operation executable by the MFP 1 is operation of printing an image and operation of transmitting an image to an external device in the form of image data. The transmission includes facsimile communication. For such image output operation, the user is allowed to give a command to scale an image laid out on an output page. Operation for giving such a scaling command includes pressing select buttons corresponding to fixed magnifications, entering a numeric value of magnification through a numeric keypad, and a multi-touch gesture.

In order to change a scale ratio of an image from a standard size to another standard size, e.g., enlarging an image from A4 size to B4 size or reducing an image from A3 size to B5 size, pressing a select button is convenient. In order to designate arbitrary magnification, entering a numeric value or a making a multi-touch gesture is useful. In particular, in order to change a scale ratio of an image with non-standard size to fit into an output page with standard size, making a multi-touch gesture is convenient.

Figure 6:
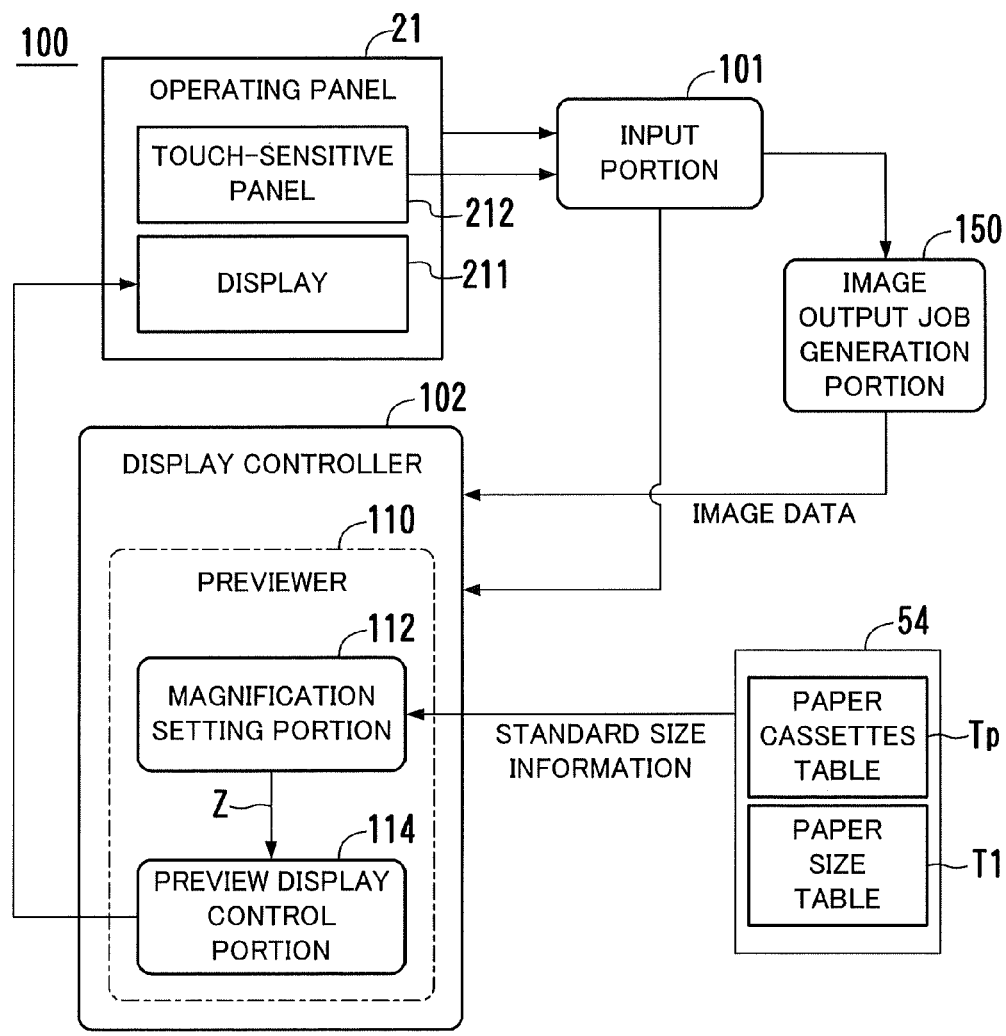
FIG. 6 is a diagram showing an example of the functional configuration of an output setting device for setting an output size of an image in an MFP.

FIG. 6 shows an example of the functional configuration of an output setting device 100 for setting an image size and an output page size in accordance with a multi-touch gesture. The output setting device 100 is configured of an input portion 101, a display controller 102, and so on. These portions are functional elements implemented in response to execution of a control program by the CPU 51 of the main controller 50.

The input portion 101 determines what kind of command is given to the MFP 1 by a user using the operating panel 21 based on an output from the touch-sensitive panel 212 and a signal from an unillustrated hardware key of the operating panel 21. The input portion 101 then conveys the user command to a portion which is to perform processing in accordance with the user command. When a multi-touch gesture is made with a preview image displayed, the input portion 101 determines whether the multi-touch gesture means a reduction command or an enlargement command to inform the determination result to the display controller 102.

The display controller 102 controls the display 211 of the operating panel 21 to display a variety of operating screens. The display controller 102 includes a previewer 110 that displays a preview of an output target image in response to a request from the image output job generation portion 150. The previewer 110 is configured of a magnification setting portion 112 and a preview display control portion 114.

The magnification setting portion 112 sets a scale ratio (output magnification of an image) Z in accordance with a reduction command or enlargement command. At this point in time, the magnification setting portion 112 obtains information on standard sizes which are choices of output page size. In the case of printing, for example, the paper cassettes table Tp and a paper size table T1 stored in the NV-RAM 54 are referred to, so that paper sizes of sheets loaded in the paper stacker 25 and dimensions of a short side and a long side of each paper size are obtained. The magnification setting portion 112 informs the preview display control portion 114 of the scale ratio Z thus set.

The preview display control portion 114 displays, on the display 211, a preview screen showing the size relationship between the image size and the output size of an output page. When the scale ratio Z is provided by the magnification setting portion 112 with the preview screen displayed, the preview display control portion 114 updates the preview screen in a manner to reflect the size relationship between an image size scaled based on the scale ratio Z and the output size.

The image output job generation portion 150 is a functional element to display, on the display 211, an operating screen through which the user gives a command to print or send an image. The image output job generation portion 150 includes a Web browser. The Web browser is an application installed onto the MFP 1 in order to enable a web page over the Internet or an intranet to be viewed on the operating panel 21.

FIGS. 7A-7C show examples of paper size tables T1, T1b, and T1c prepared assuming that the MFP 1 is used in Japan, North America, and Europe, respectively. The paper size tables T1, T1b, and T1c show dimensions of a short side and a long side of paper of standard size used generally in each region where the MFP 1 is used. For example, the standard sizes shown in the paper size table T1 for Japan are A5 size, B5 size, A4 size, B4 size, and A3 size.

Figure 8:
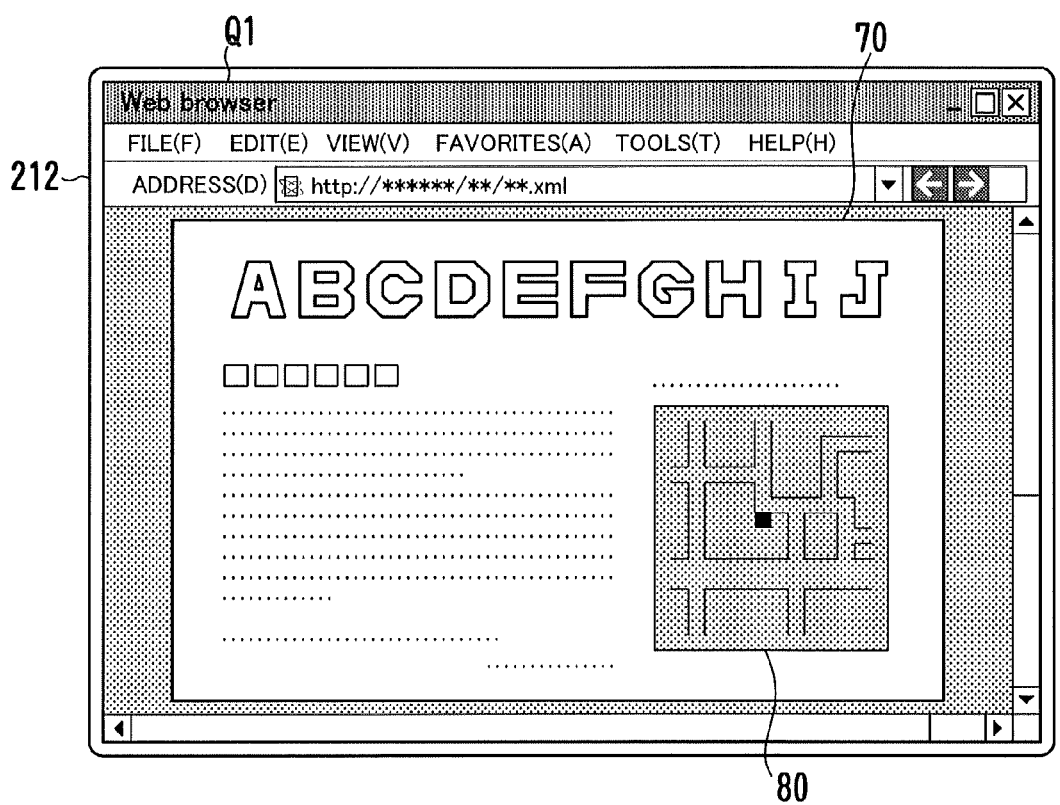
FIG. 8 is a diagram showing an example of a screen display related to operation for giving a command to output an image.

FIG. 8 shows an example of a screen display in the operating panel 21. Referring to FIG. 8, a screen Q1 is displayed on substantially the entire touch-sensitive surface of the touch-sensitive panel 212. The screen Q1 is a browsing screen of a Web browser. The Web page 70 is displayed on the screen Q1. The Web page 70 contains a map 80 therein.

In the sate shown in FIG. 8, the user can give a command to display a print preview by performing predetermined operation. For example, the user touches a menu bar on the upper part of the screen Q1 to display a pull-down menu, and selects a print preview from the pull-down menu. In response to a command to display a print preview given by the user, a preview screen Q2 is displayed as shown in FIG. 9.

Figure 9:
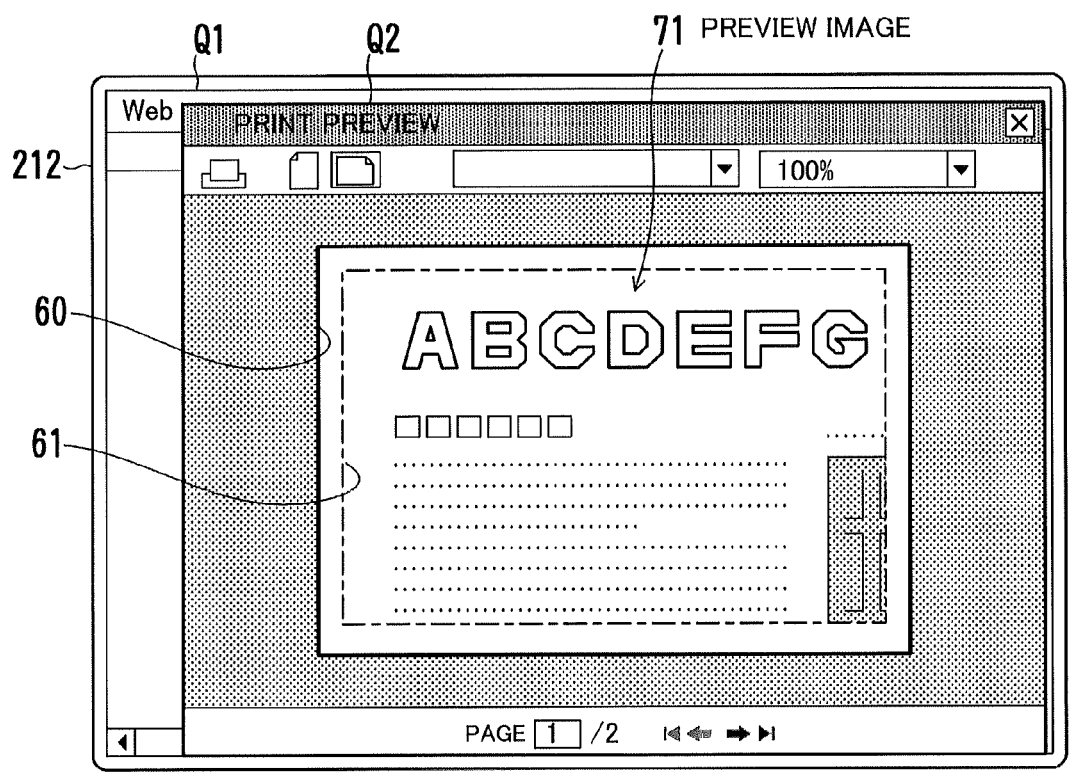
FIG. 9 is a diagram showing an example of a preview related to a multi-touch gesture.

Referring to FIG. 9, the preview screen Q2 displayed above the screen Q1 has a preview image 71 representing the Web page 70. The preview image 71 is laid out in a rectangle region 60 which represents an output page. In printing by the MFP 1, a margin is provided in the edge of paper. Therefore, the Web page 70, which is a print target image, is actually laid out in a part of the output page without the margin. Referring to FIG. 9, a rectangular region 61 enclosed by the alternate long and short dashed lines drawn in the inside the region 60 corresponds to the part of the output page without the margin. The preview image 71 is positioned in such a manner that the upper left corner thereof is aligned over the upper left corner of the region 61. Accordingly, when the output page has a margin as described above, the substantial output size is a size of the output page excluding the margin.

As understood from the comparison between FIG. 8 and FIG. 9, the preview image 71 of FIG. 9 does not correspond to the entirety of the Web page 70 of FIG. 8. To be specific, the preview image 71 of FIG. 9 shows the Web page 70 with the right and bottom ends thereof omitted. Stated differently, a state is shown in which, by displaying the region 61 and the preview image 71, the image size of the Web page 70 is larger than the substantial size of the output page (hereinafter, refereed to as an "output size"), and thus, the Web page 70 extends beyond the output page and the extended part is hidden. The user performs operation for changing a displayed page to display the hidden part.

In a state where the preview screen Q2 showing the size relationship between the image size and the output size is displayed, the user makes a multi-touch gesture to give a command to scale the image size. A region of the touch-sensitive surface where a multi-touch gesture is valid is the region 61 where the preview image 71 is laid out. It is also possible to make a multi-touch gesture valid in an area larger than the region 61 containing the periphery of the region 60 in the preview screen Q2.

In the MFP 1, scaling an image via a multi-touch gesture is different from changing the magnification successively in accordance with change in space between fingers via pinch-out or pinch-in. Scaling an image in the MFP 1 is changing the magnification at once to match the image size to a standard output size. In the case of changing the magnification successively, it is difficult to adjust a space between the fingers so that an image fits into paper. In the case of scaling an image in the MFP 1, it is unnecessary to finely adjust a space between the fingers and to pay attention to finger movement speed. Scaling an image in the MFP 1 enables an image to be appropriately scaled up or down simply by moving fingers apart or closer together, and to fit into paper for printing.

Figure 10:
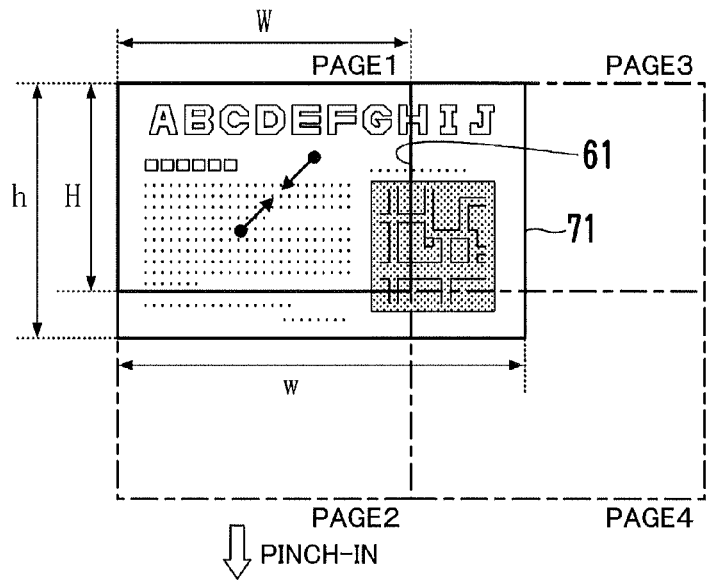
Figure 10:
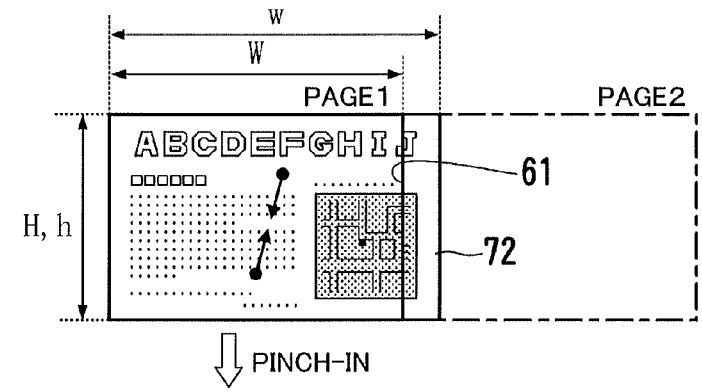
Figure 10:
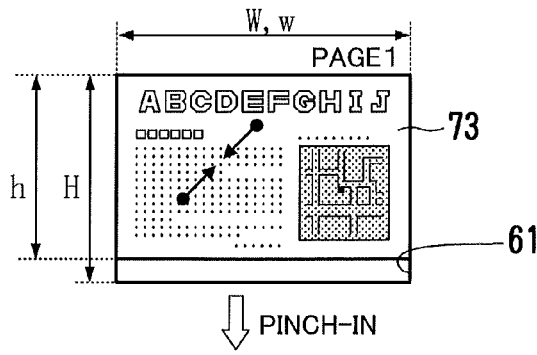
Figure 10:
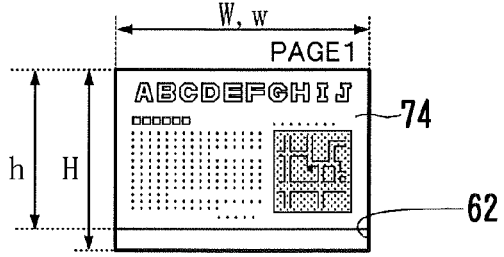

FIG. 10 shows an example of reduction in image size via pinch-in for the case where the Web page 70 shown in FIG. 8 is printed. FIG. 10 shows schematically four states of preview display.

In (A) of FIG. 10, an initial state of the preview display corresponding to FIG. 9 is shown. In the initial state, the size relationship between the preview image 71 corresponding to the Web page 70 and the region 61 corresponding to the output page is displayed. As described earlier, the region 61 corresponds to a part of paper with a margin in the periphery thereof excluded. In the illustrated example, the paper size in the initial state is A4 size, and the output page orientation is orientation extending horizontally, i.e., landscape orientation. The initial value of the output magnification of an image (herein print magnification) is 1 (100% percentage-wise).

The preview image 71 in the initial state is larger than the region 61 in vertical and horizontal dimensions. To be specific, the vertical dimension (length in the vertical direction) h of the current image size shown in the preview image 71 is greater than the vertical dimension H of the output size represented by the region 61. Further, the horizontal dimension (length in the horizontal direction) w of the current image size shown in the preview image 71 is greater than the horizontal dimension W of the output size represented by the region 61. In other words, both the following equations are satisfied: h>H; and w>W. Moreover, the aspect ratio of the preview image 71 is different from the aspect ratio of A4 size. The preview image 71 extends horizontally as compared to the region 61.

In the state of (A) of FIG. 10, when the user makes a pinch-in gesture as represented by a couple of filled circles and the arrows extending from the circles to each other, the image is reduced on the precondition that the aspect ratio of the image size remains unchanged. At this point in time, the scale ratio is set, among scale ratios set in such a manner that at least one of the vertical dimension h and the horizontal dimension w of the image size is equal to either one of the vertical dimension H and the horizontal dimension W of the current output size, at a scale ratio closest to the current scale ratio. Scaling by the MFP 1 is characterized in that the vertical dimension h is made equal to the vertical dimension H or the horizontal dimension W but not limited to being made equal only to the vertical dimension H, and further, in that the horizontal dimension w is made equal to the horizontal dimension W or the vertical dimension H but not limited to being made equal only to the horizontal dimension W.

As shown in the example of FIG. 10, when the aspect ratio of the image size is different from the aspect ratio of standard size, the vertical dimension h or the horizontal dimension w of the image size conforms to the vertical dimension H or the horizontal dimension W of the output size eventually. In contrast, when the aspect ratio of the image size is equal to the aspect ratio of the standard size, the vertical dimension h conforms to the vertical dimension H, and at the same time, the horizontal dimension w conforms to the horizontal dimension W.

Referring to (A) of FIG. 10, the vertical dimension ratio (H/h) of the region 61 and the preview image 71 is greater than the horizontal dimension ratio (W/w) thereof. Stated differently, the vertical dimension ratio (H/h) of the output size and the image size is greater than the horizontal dimension ratio (W/w) thereof. In a state where the orientation of the output page is landscape orientation, when the vertical dimension ratio corresponding to short sides is greater than the horizontal dimension ratio corresponding to long sides, an image is reduced in such a manner that the vertical dimension h is made equal to the vertical dimension H. This makes the ratio difference between pre-reduction image and post-reduction image small as compared to the case where the vertical dimension h is made equal to the horizontal dimension W, the case where the horizontal dimension w is made equal to the vertical dimension H, or the case where the horizontal dimension w is made equal to the horizontal dimension W. The result of such reduction is displayed as a preview image 72.

In a state where the size relationship between the image size and the output size is shown by the preview image 72 and the region 61 of (B) of FIG. 10, when another pinch-in gesture is made, the image size is further reduced. Since the vertical dimension h of the preview image 72 is equal to the vertical dimension H of the region 61, and further, since the preview image 72 extends horizontally over the region 61, the horizontal dimensions w and W are made equal to each other through this time of reduction. The result of reduction is displayed as a preview image 73.

In a state where the preview image 73 is displayed as shown in (C) of FIG. 10, when a pinch-in gesture is made, the image size is further reduced. At this time, the vertical dimension h of the preview image 73 is smaller than the vertical dimension H of the region 61, and the horizontal dimension w of the preview image 73 is equal to the horizontal dimension W of the image size. Stated differently, the image size cannot be further reduced to fit into the output size without changing the output size. In view of this, the output size is changed from A4 size to B5 size which is the next smallest size after A4 size among the choices.

In this example, when the output size is set at B5 size, the vertical dimension of the image size corresponding to the preview image 73 is substantially equal to the vertical dimension of B5 size. In short, the reduction does not change the image size substantially. In view of this, reduction for making the horizontal dimension w of the image size equal to the horizontal dimension W of the output size is performed to satisfy the intention of the user who made the pinch-in gesture. The result of reduction is displayed as a preview image 74 as shown in (D) of FIG. 10.

Figure 11:
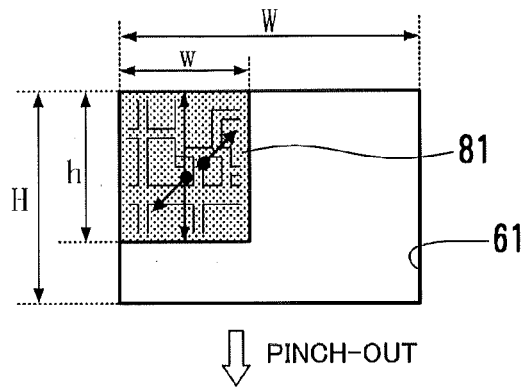
FIG. 11 is a diagram showing an example of enlargement in image size via pinch-out.
Figure 11:
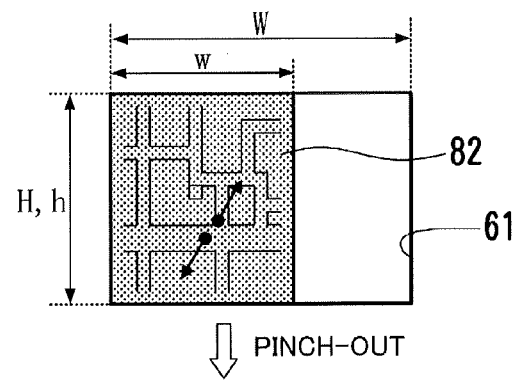
Figure 11:
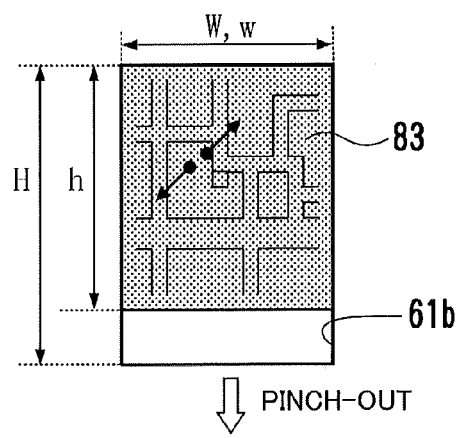
Figure 11:
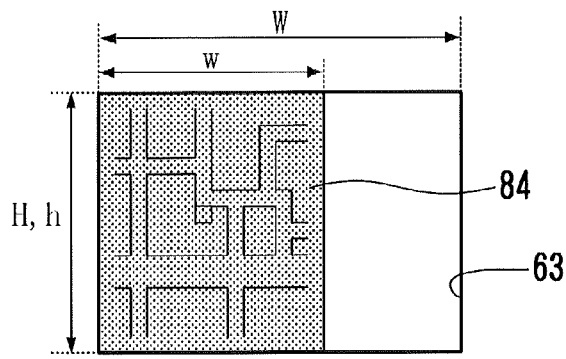

FIG. 11 shows an example of enlargement in image size via pinch-out. The case is assumed in which the map 80 of the Web page 70 shown in FIG. 8 is printed. FIG. 11 shows schematically four states of preview display.

In (A) of FIG. 11, an initial state of the preview display is shown. In the initial state, the size relationship between a preview image 81 corresponding to the map 80 of the Web page 70 and the region 61 corresponding to the output page is displayed. The paper size in the initial state is A4 size, and the output page orientation is landscape orientation. The initial value of the output magnification of an image is 100%.

The preview image 81 in the initial state is smaller than the region 61 in vertical and horizontal dimensions. To be specific, the vertical dimension h of the current image size shown in the preview image 81 is smaller than the vertical dimension H of the output size represented by the region 61. Further, the horizontal dimension w of the current image size shown in the preview image 81 is smaller than the horizontal dimension W of the output size represented by the region 61. In other words, both the following equations are satisfied: h<H; and w<W. The preview image 81 extends somewhat vertically (h>w).

In the state of (A) of FIG. 11, when the user makes a pinch-out gesture as represented by a couple of filled circles and the arrows extending from the circles to the directions opposite to each other, the image is enlarged on the precondition that the aspect ratio of the image size remains unchanged. At this point in time, the scale ratio is set, among scale ratios set in such a manner that at least one of the vertical dimension h and the horizontal dimension w of the image size is equal to either one of the vertical dimension H and the horizontal dimension W of the current output size, at a scale ratio closest to the current scale ratio. As with the foregoing case of reduction, in the case of enlargement, the vertical dimension h is made equal to the vertical dimension H or the horizontal dimension W but not limited to being made equal only to the vertical dimension H, and further, the horizontal dimension w is made equal to the horizontal dimension W or the vertical dimension H but not limited to being made equal only to the horizontal dimension W.

Referring to (A) of FIG. 11, the vertical dimension ratio (H/h) of the region 61 and the preview image 81 is smaller than the horizontal dimension ratio (W/w) thereof. Stated differently, the vertical dimension ratio (H/h) of the output size and the image size is smaller than the horizontal dimension ratio (W/w) thereof.

Accordingly, an image size is enlarged in such a manner that the vertical dimension h is made equal to the vertical dimension H. This makes the ratio difference between pre-enlargement image and post-enlargement image small as compared to the case where the vertical dimension h is made equal to the horizontal dimension W, the case where the horizontal dimension w is made equal to the vertical dimension H, or the case where the horizontal dimension w is made equal to the horizontal dimension W. The result of such enlargement is displayed as a preview image 82.

In a state where the size relationship between the image size and the output size is shown by the preview image 82 and the region 61 of (B) of FIG. 11, when another pinch-out gesture is made, the image size is further enlarged. Since the vertical dimension h of the preview image 82 is equal to the vertical dimension H of the region 61, and further, since the preview image 72 is smaller than the region 61 in the horizontal direction, the output page orientation is changed from landscape to portrait orientation for this time of enlargement. The portrait orientation is orientation extending vertically. The horizontal dimension w of the image size is made equal to the horizontal dimension W of the output size in portrait orientation. The result of enlargement is displayed as a preview image 83.

In a state where the preview image 83 and a region 61*b* corresponding to A4 size in portrait orientation are displayed as shown in (C) of FIG. 11, when a pinch-out gesture is made, the image size is further enlarged. At this point in time, a preview image of A4 size in landscape orientation and a preview image of A4 size in portrait orientation are displayed. This means that, even if the orientation of the output page of A4 size is changed, enlargement is impossible. In view of this, the output size is changed from A4 size to B4 size which is the next largest size after A4 size among the choices.

In the example of FIG. 11, enlargement is so performed that the orientation of the output page (B4 size) is set at landscape orientation and that the vertical dimension h of the image size is made equal to the vertical dimension H of the output size. This is because such an enlargement ratio is smaller than scale ratios for other ways of enlargement. The other ways of enlargement are: enlargement in which the output page orientation is set at landscape orientation and the horizontal dimension w is made equal to the horizontal dimension W; enlargement in which the output page orientation is set at portrait orientation and the vertical dimension h or the horizontal dimension w is made equal to either one of the vertical dimension H and the horizontal dimension W. The result of enlargement is displayed as a preview image 84 as shown in (D) of FIG. 11, and along with this, a region 63 showing the output page is displayed.

Figure 12:
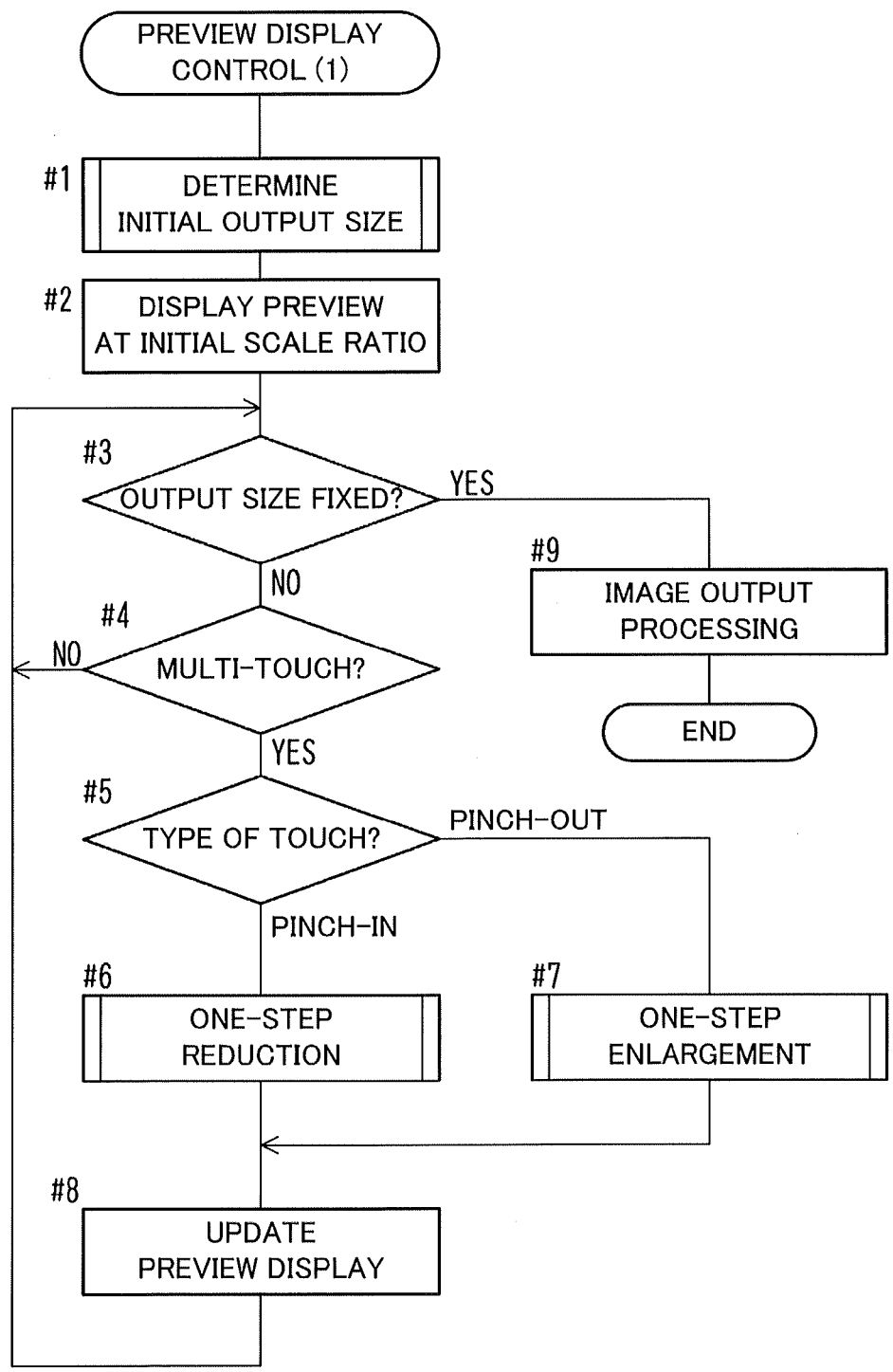
FIG. 12 is a flowchart depicting a first example of preview display control.

FIG. 12 is a flowchart depicting a first example of preview display control performed by the previewer 110 (see FIG. 6).

When a preview command by a user is conveyed by the input portion 101, the previewer 110 determines an initial output size which is an output size at the start of preview display (Step #1). When the initial output size is determined, the preview display control portion 114 displays the size relationship between an image size of an output target image and the initial output size (Step #2). The initial scale ratio (scale ratio of the image size at this point in time) is 100%. In short, the relationship between an output page and the image to be outputted in 100% scale ratio is displayed.

If the image size and the output size are fixed (Yes in Step #3) by performing operation of giving a' command to finish the preview display or operation of giving a command to start image output, then the previewer 110 performs image output processing (Step #9). The image output processing is to inform a functional portion which prints or sends an image of the image size and the output size currently set.

If a multi-touch gesture is made while the preview image is displayed (Yes in Step #4), then the magnification setting portion 112 performs one-step reduction or one-step enlargement depending on the type of scaling instructed through the multi-touch gesture (Steps #5, #6, and #7). To be specific, when the multi-touch gesture is pinch-in, a scale ratio for reducing the image size is set in the one-step reduction. When the multi-touch gesture is pinch-out, a scale ratio for enlarging the image size is set in the one-step enlargement. Through the one-step reduction and the one-step enlargement, the output size is changed if necessary.

When the scale ratio of the image size is changed through the one-step reduction or the one-step enlargement, the preview display control portion 114 updates the preview image for display (Step #8). Stated differently, the preview display control portion 114 controls the display 211 to display the size relationship between the output size and the image size that has been scaled based on the changed scale ratio. After that, the process flow returns to Step #3 in which scaling the image size and updating the preview display are repeated depending on operation until the output size is fixed.

Figure 13:
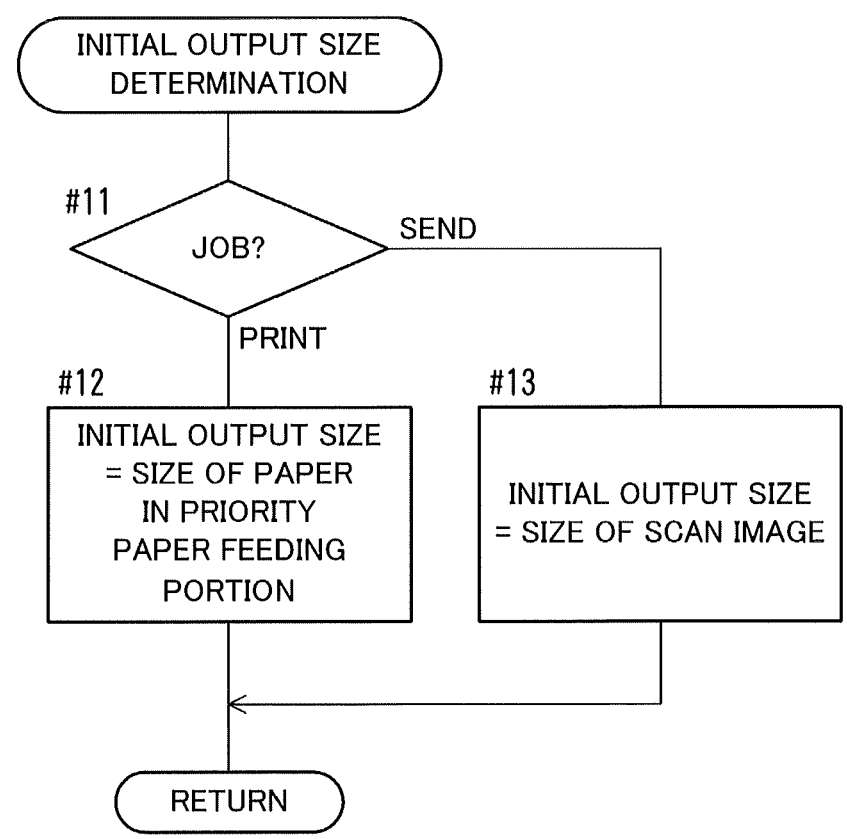
FIG. 13 is a flowchart of an initial output size determination routine in preview display control.

FIG. 13 is a flowchart of an initial output size determination routine in the preview display control of FIG. 12. The previewer 110 determines the initial output size depending on the type of a job given from the user. When the job is a print job such as copying or printing a document in the box 30, it is determined that the initial output size is the size of paper loaded in one of the paper cassettes 45, 46, 47, and 48 set at a priority paper feeding portion, e.g., the paper cassette 45 (Steps #11 and #12). When the job is a transmission job of sending a scan image obtained from a document sheet to an external device, it is determined that the initial output size is the size of the scan image (Steps #11 and #13). The size of the scan image is set automatically or manually. For automatic setting, among a plurality of the standard sizes, the smallest size enough to contain the document sheet is used as the size of the scan image.

Figure 14:
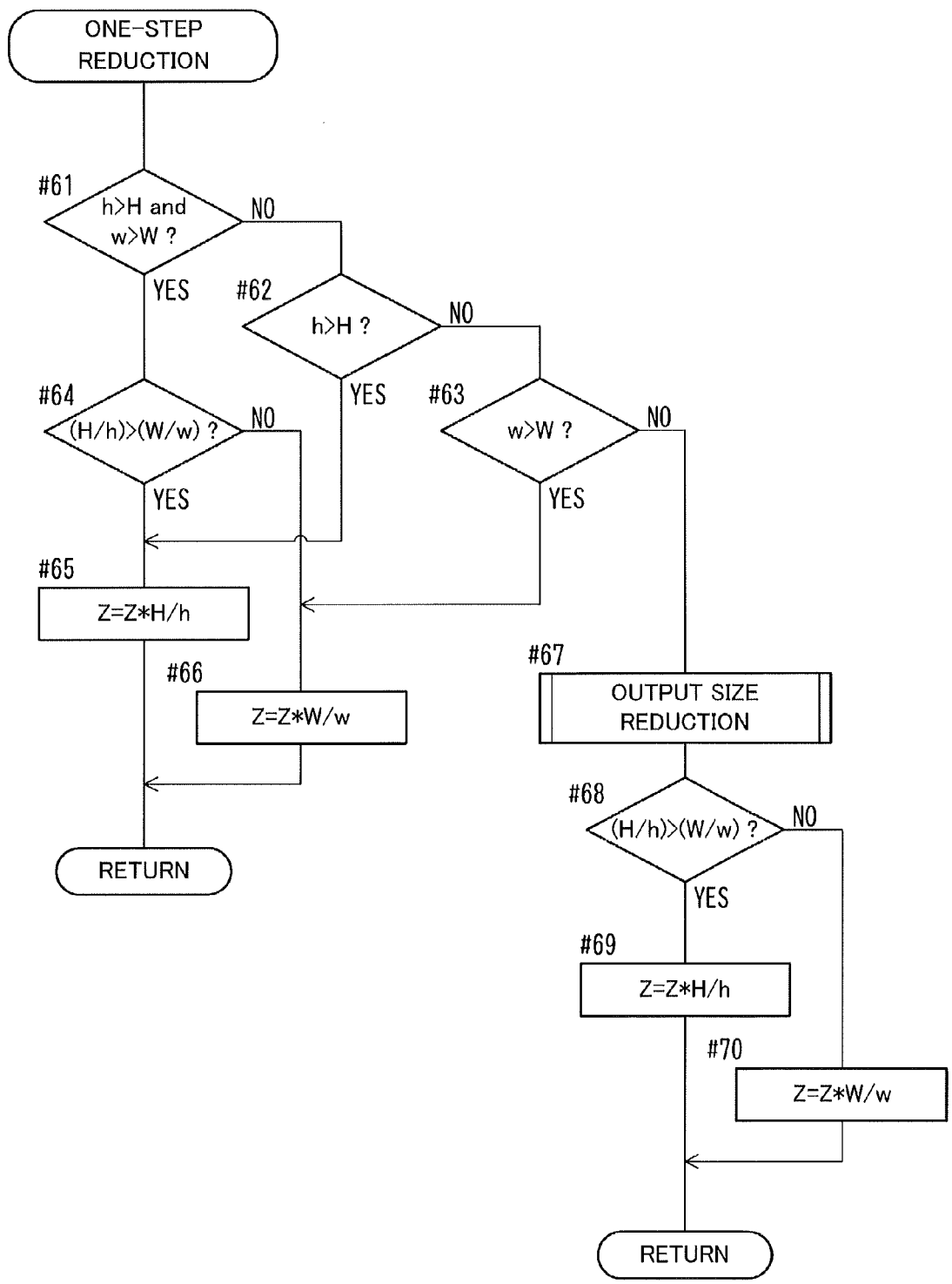
FIG. 14 is a flowchart of a one-step reduction routine in preview display control.

FIG. 14 is a flowchart of the one-step reduction routine in the preview display control of FIG. 12.

If the image size is larger than the output size both in the vertical and horizontal directions (Yes in Step #61) as shown in (A) of FIG. 10, then the magnification setting portion 112 compares the vertical dimension ratio (H/h) of the image size and the output size with the horizontal dimension ratio (W/w) of the image size and the output size (Step #64). If the vertical dimension ratio (H/h) is greater than the horizontal dimension ratio (W/w) (Yes in Step #64), then the scale ratio Z is updated to have a value of the product of the current scale ratio Z and the vertical dimension ratio (H/h) (Step #65). On the other hand, if the vertical dimension ratio (H/h) is equal to or smaller than the horizontal dimension ratio (W/w) (No in Step #64), then the scale ratio Z is updated to have a value of the product of the current scale ratio Z and the horizontal dimension ratio (W/w) (Step #66).

If the vertical dimension h is greater than the vertical dimension H and the horizontal dimension w is equal to or smaller than the horizontal dimension W (No in Step #61 and Yes in Step #62), then the scale ratio Z is updated to have a value of the product of the current scale ratio Z and the vertical dimension ratio (H/h) (Step #65). If the vertical dimension h is equal to or smaller than the vertical dimension H and the horizontal dimension w is greater than the horizontal dimension W (No in Step #62 and Yes in Step #63), then the scale ratio Z is updated to have a value of the product of the current scale ratio Z and the horizontal dimension ratio (W/w) (Step #66).

If the image size is equal to or smaller than the output size both in the vertical and horizontal directions (No in Step #63), then the magnification setting portion 112 performs an output size reduction subroutine (Step #67). After the output size reduction subroutine in which the output size is changed to be smaller by one step, the magnification setting portion 112 compares again the vertical dimension ratio (H/h) with the horizontal dimension ratio (W/w) (Step #68). If the vertical dimension ratio (H/h) is greater than the horizontal dimension ratio (W/w) (Yes in Step #68), then the scale ratio Z is updated to have a value of the product of the current scale ratio Z and the vertical dimension ratio (H/h) (Step #69). If the vertical dimension ratio (H/h) is equal to or smaller than the horizontal dimension ratio (W/w) (No in Step #68), then the scale ratio Z is updated to have a value of the product of the current scale ratio Z and the horizontal dimension ratio (W/w) (Step #70).

Figure 15:
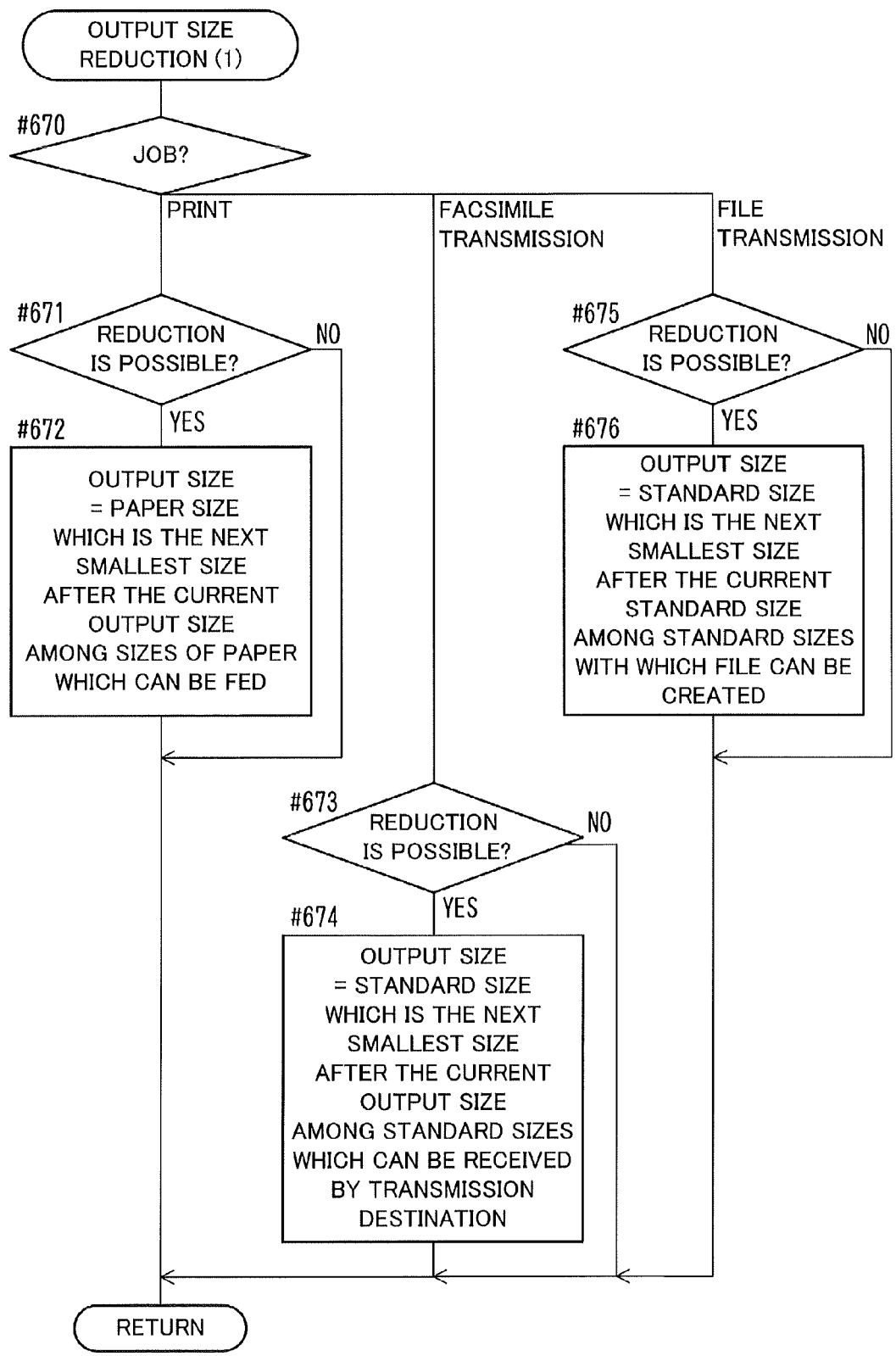
FIG. 15 is a flowchart of an output size reduction subroutine in a one-step reduction routine.

FIG. 15 is a flowchart of the output size reduction subroutine in the one-step reduction routine of FIG. 14. The magnification setting portion 112 checks the type of a job for outputting an image (Step #670), and determines an output size depending on the type of the job.

When the job is a print job, the magnification setting portion 112 checks whether or not it is possible to reduce the output size (Step #671). To be specific, the magnification setting portion 112 checks whether or not the current output size corresponds to a paper size which is the smallest in size of sheets of paper loaded in the paper stacker 25 indicated in the paper cassettes table Tp. If it is possible to reduce the output size (Yes in Step #671), then the output size is changed to a paper size which is the next smallest size after the current output size among sizes of paper which can be fed (Step #672).

When the job is a facsimile transmission job, the magnification setting portion 112 checks whether or not the current output size corresponds to the smallest size of the standard sizes that can be received by a transmission destination indicated in the information from the image output job generation portion 150 (Step #673). In short, the magnification setting portion 112 checks whether or not it is possible to reduce the output size. If it is possible to reduce the output size (Yes in Step #673), then the output size is changed to a standard size which is the next smallest size after the current output size among standard sizes which can be received by the transmission destination (Step #674).

When the job is a file transmission job of sending an image file to an external device, the magnification setting portion 112 checks whether or not the current output size is the smallest size of the standard sizes with which the MFP 1 can create a file (Step #675). In short, the magnification setting portion 112 checks whether or not it is possible to reduce the output size. If it is possible to reduce the output size (Yes in Step #675), then the output size is changed to a standard size which is the next smallest size after the current standard size among standard sizes with which a file can be created (Step #676).

Figure 16:
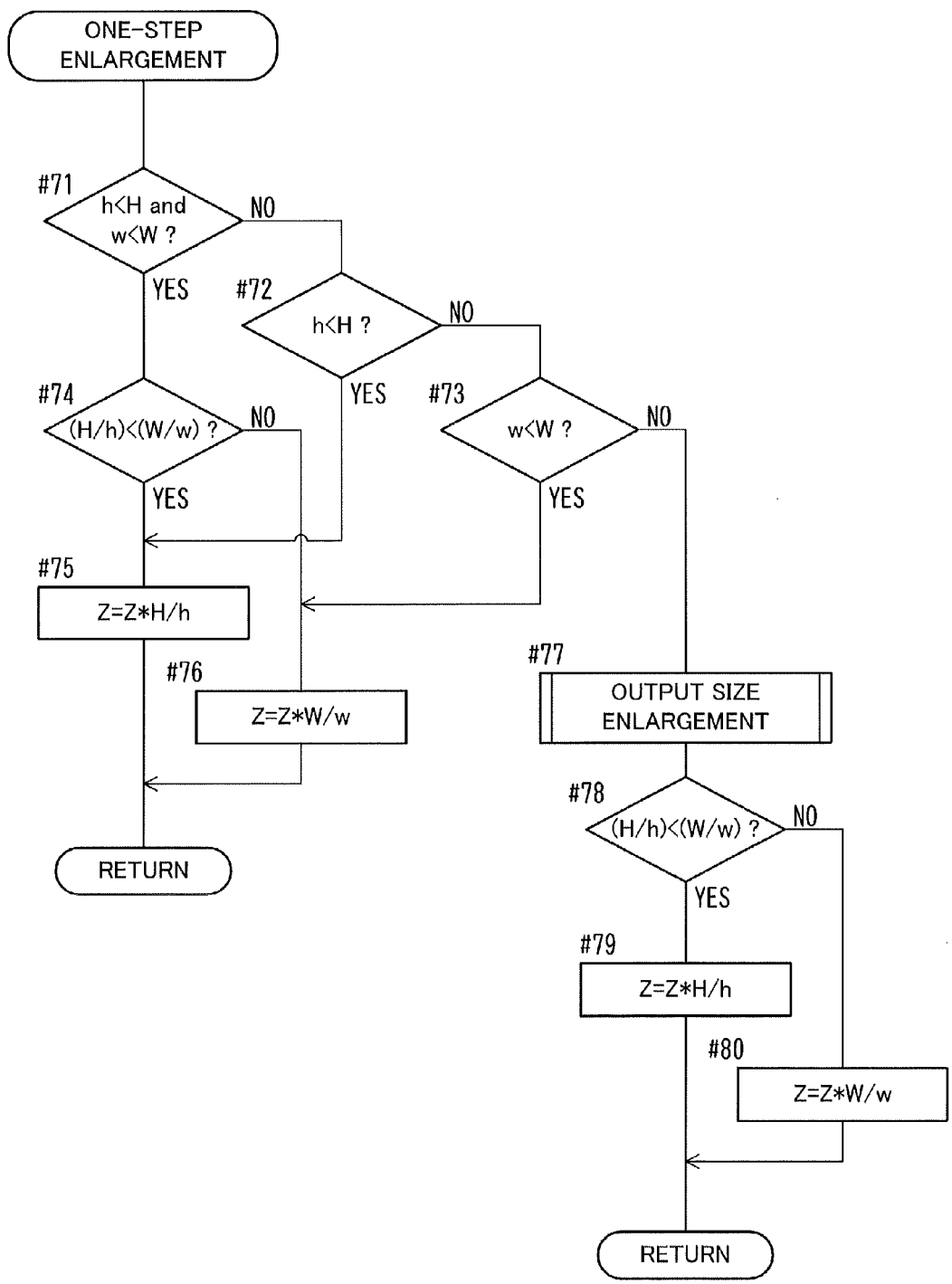
FIG. 16 is a flowchart of a one-step enlargement routine in preview display control.

FIG. 16 is a flowchart of the one-step enlargement routine in the preview display control of FIG. 12.

If the image size is smaller than the output size both in the vertical and horizontal directions (Yes in Step #71) as shown in (A) of FIG. 11, then the magnification setting portion 112 compares the vertical dimension ratio (H/h) of the image size and the output size with the horizontal dimension ratio (W/w) of the image size and the output size (Step #74). If the vertical dimension ratio (H/h) is smaller than the horizontal dimension ratio (W/w) (Yes in Step #74), then the scale ratio Z is updated to have a value of the product of the current scale ratio Z and the vertical dimension ratio (H/h) (Step #75). On the other hand, if the vertical dimension ratio (H/h) is equal to or greater, than the horizontal dimension ratio (W/w) (No in Step #74), then the scale ratio Z is updated to have a value of the product of the current scale ratio Z and the horizontal dimension ratio (W/w) (Step #76).

If the vertical dimension h is smaller than the vertical dimension H and the horizontal dimension w is equal to or greater than the horizontal dimension W (No in Step #71 and Yes in Step #72), then the scale ratio Z is updated to have a value of the product of the current scale ratio Z and the vertical dimension ratio (H/h) (Step #75). If the vertical dimension h is equal to or greater than the vertical dimension H and the horizontal dimension w is smaller than the horizontal dimension W (No in Step #72 and Yes in Step #73), then the scale ratio Z is updated to have a value of the product of the current scale ratio Z and the horizontal dimension ratio (W/w) (Step #76).

If the image size is equal to or greater than the output size both in the vertical and horizontal directions (No in Step #73), then the magnification setting portion 112 performs an output size enlargement subroutine (Step #77). After the output size enlargement subroutine in which the output size is changed to be greater by one step, the magnification setting portion 112 compares again the vertical dimension ratio (H/h) with the horizontal dimension ratio (W/w) (Step #78). If the vertical dimension ratio (H/h) is smaller than the horizontal dimension ratio (W/w) (Yes in Step #78), then the scale ratio Z is updated to have a value of the product of the current scale ratio Z and the vertical dimension ratio (H/h) (Step #79). If the vertical dimension ratio (H/h) is equal to or greater than the horizontal dimension ratio (W/w) (No in Step #78), then the scale ratio Z is updated to have a value of the product of the current scale ratio Z and the horizontal dimension ratio (W/w) (Step #80).

Figure 17:
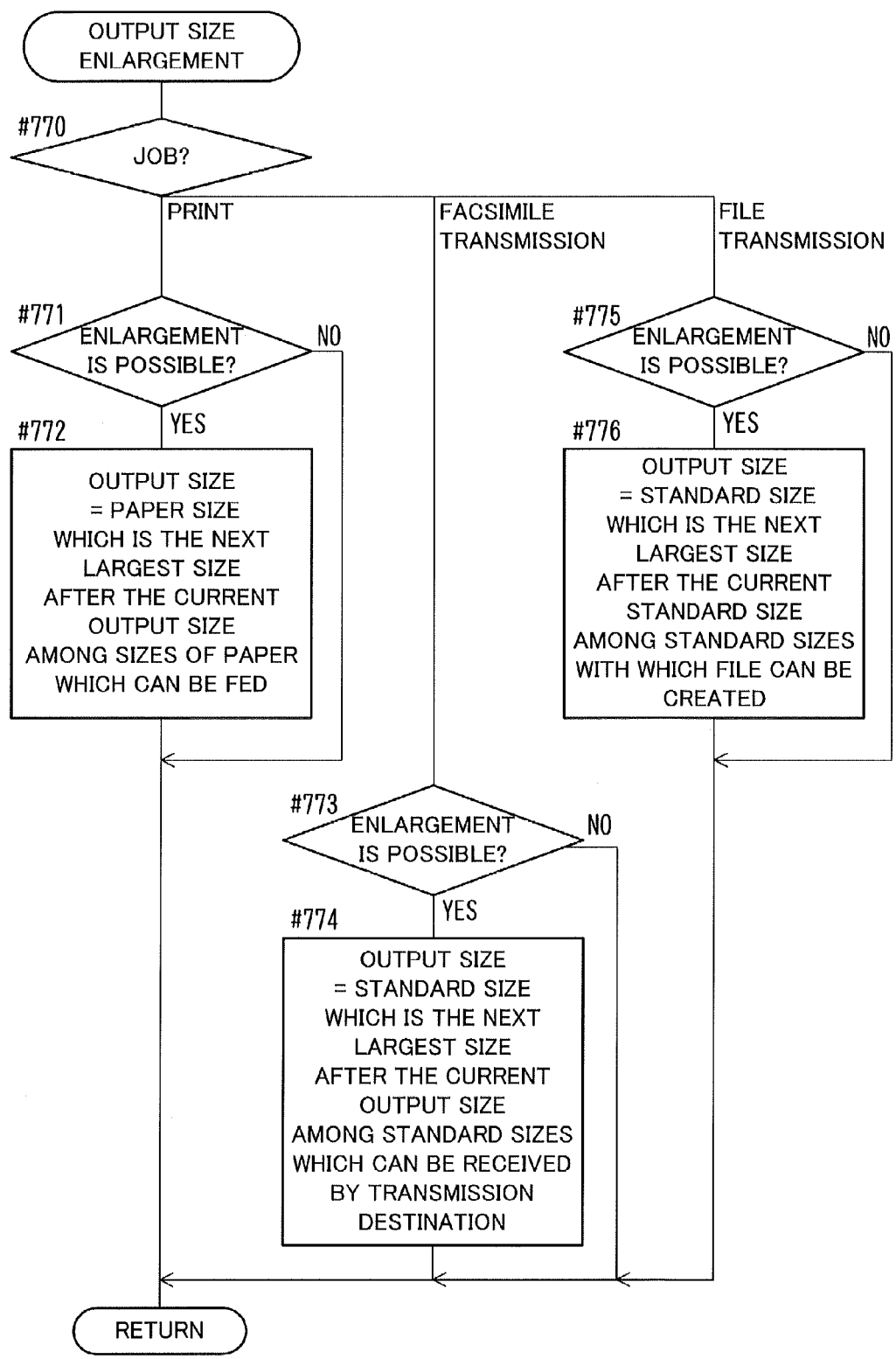
FIG. 17 is a flowchart of an output size enlargement subroutine in a one-step enlargement routine.

FIG. 17 is a flowchart of the output size enlargement subroutine in the one-step enlargement routine. The magnification setting portion 112 checks the type of a job for outputting an image (Step #770), and determines an output size depending on the type of the job.

When the job is a print job, the magnification setting portion 112 checks whether or not it is possible to enlarge the output size (Step #771). To be specific, the magnification setting portion 112 checks whether or not the current output size corresponds to a paper size which is the largest in size of sheets of available paper indicated in the paper cassettes table Tp. If it is possible to enlarge the output size (Yes in Step #771), then the output size is changed to a paper size which is the next largest size after the current output size among sizes of paper which can be fed (Step #772).

When the job is a facsimile transmission job, the magnification setting portion 112 checks whether or not the current output size corresponds to the largest size of standard sizes that can be received by a transmission destination indicated in the information from the image output job generation portion 150 (Step #773). In short, the magnification setting portion 112 checks whether or not it is possible to enlarge the output size. If it is possible to enlarge the output size (Yes in Step #773), then the output size is changed to a standard size which is the next largest size after the current output size among standard sizes which can be received by the transmission destination (Step #774).

When the job is a file transmission job of sending an image file to an external device, the magnification setting portion 112 checks whether or not the current output size is the largest size of the standard sizes with which the MFP 1 can create a file (Step #775). In short, the magnification setting portion 112 checks whether or not it is possible to enlarge the output size. If it is possible to enlarge the output size (Yes in Step #775), then the output size is changed to a standard size which is the next largest size after the current standard size among standard sizes with which a file can be created (Step #776).

Figure 18:
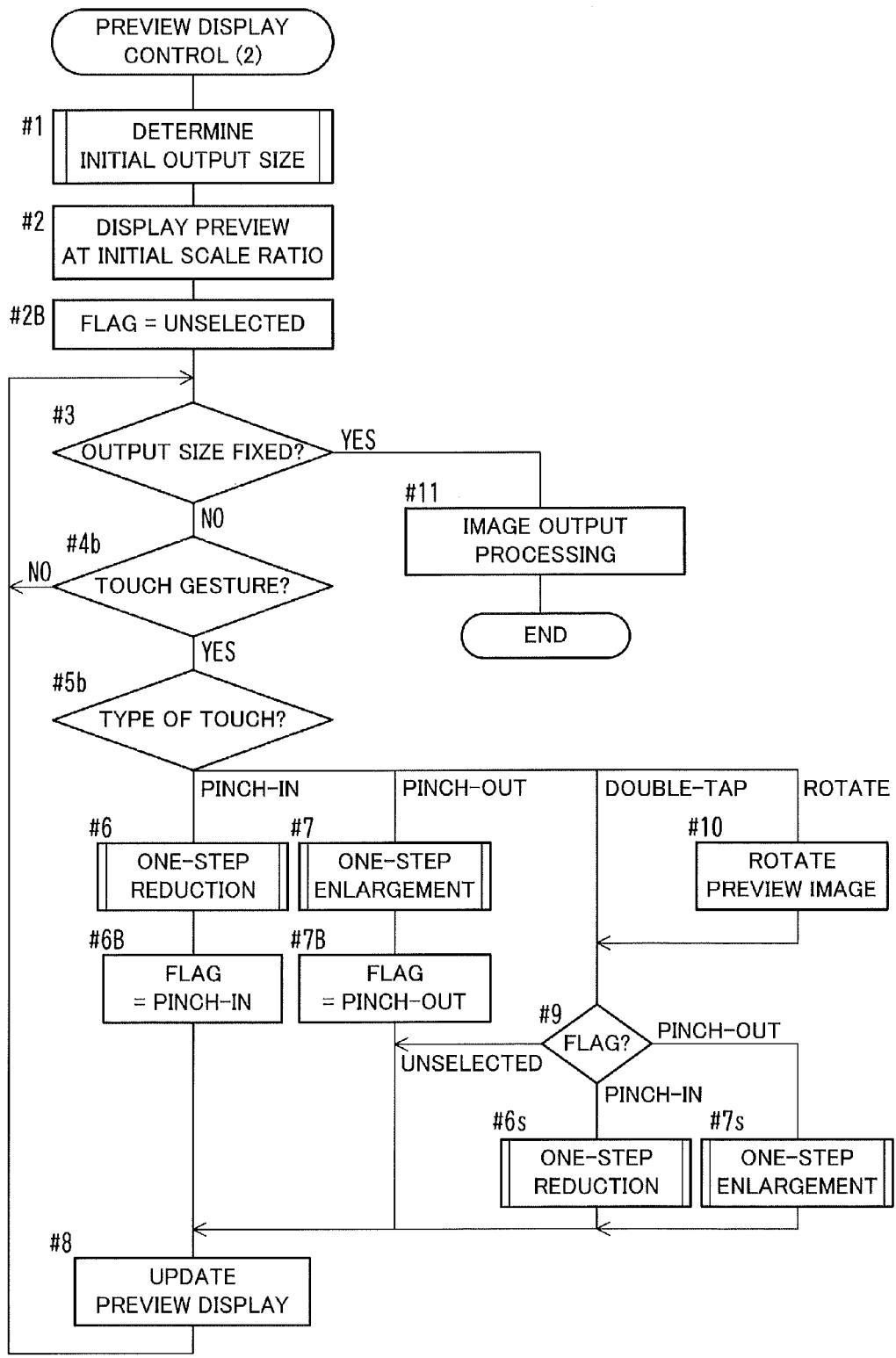
FIG. 18 is a flowchart depicting a second example of preview display control.

FIG. 18 is a flowchart depicting a second example of the preview display control executed by the previewer 110. In the second example, an attempt is made to provide a variety of operation and improve the operational flexibility for giving a command to change the scale ratio of an image. In the first example of FIG. 12, the image size is reduced or enlarged step by step every time when a pinch-in or pinch-out gesture is made. In contrast, according to the second example, double-tap after pinch-in is made is deemed as a reduction command similarly to the case of pinch-in, and further, double-tap following pinch-out is deemed as an enlargement command similarly to the case of pinch-out. The double-tap is a gesture of rapidly touching the touch-sensitive surface twice with fingertip. In a state in which a preview image is displayed, rotate is acknowledged as a multi-touch gesture for giving a command to rotate an image by a user.

In the flowchart of FIG. 18, processing that is common to that in the flowchart of FIG. 12 is identified with the identical step numbers. The processing according to the second example is described below. The description focuses on the processing different from that in FIG. 12.

The previewer 110 determines the initial output size (Step #1), displays the size relationship between an image size at the initial scale ratio and an initial output size (Step #2), and sets a flag showing which scale ratio is selected at an "unselected" (Step #2B).

If a touch gesture is made in a state where a preview image is displayed before fixing the output size (No in Step #3 and Yes in Step #4), the magnification setting portion 112 performs processing depending on the type of a touch gesture.

If the touch gesture is pinch-in, then the magnification setting portion 112 executes the one-step reduction routine for setting a scale ratio to reduce the image size (Step #6), and sets the flag at "pinch-in" (Step #6B). If the touch gesture is pinch-out, then the magnification setting portion 112 executes the one-step enlargement routine for setting a scale ratio to enlarge the image size (Step #7), and sets the flag at "pinch-out" (Step #7B).

If the touch gesture is double-tap, then the magnification setting portion 112 checks the flag (Step #9). If the flag is set at "pinch-in", then the magnification setting portion 112 executes the one-step reduction routine similarly to Step #6 (Step #6s). If the flag is set at "pinch-out", then the magnification setting portion 112 executes the one-step enlargement routine similarly to Step #7 (Step #7s). If the flag is set at "unselected", then the magnification setting portion 112 does not change the scale ratio. Thus, in such a case, the current preview remains displayed in Step #8.

If the touch gesture is rotate, then the magnification setting portion 112 changes the orientation of the image (Step #10). This is reflected as rotation of the preview image in the preview display updated in Step #8. If rotate to give a command for quarter rotation is made, then the orientation of the image is changed, so that the vertical dimension of the image size and the horizontal dimension thereof are switched.

After the orientation of the image is changed, the flow goes to Step #9 in which the magnification setting portion 112 checks the flag. If the flag is set at "pinch-in" or "pinch-out", then the process goes to Step #6s or Step #7s in which a scale ratio of the image size is set. According to this processing flow, as long as the user makes a rotate gesture following pinch-in or pinch-out, it is possible to preview a state of the image which has been rotated and scaled, which saves the user from having to make a rotate gesture following pinch-in or pinch-out.

Figure 19:
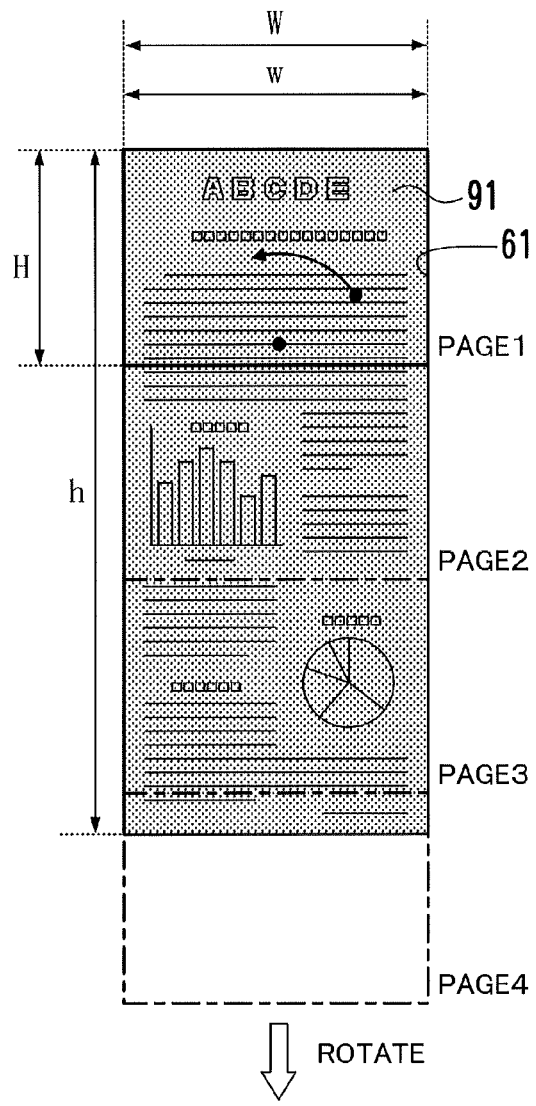
FIG. 19 is a diagram showing an example of reduction in image size via rotate.
Figure 19:
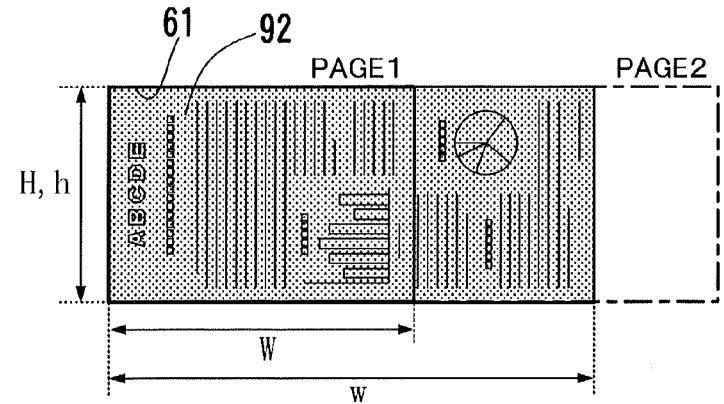

FIG. 19 is a diagram showing an example of reduction in image size via rotate. Referring to (A) of FIG. 19, an image size shown in a preview image 91 is much longer vertically than the output size represented by the region 61. This often occurs in the case of printing a Web page created on the precondition that an image is scrolled through.

In (A) of FIG. 19, image size reduction is performed in accordance with pinch-in, and the horizontal dimension w of the image size conforms to the horizontal dimension W of the output size which is A4 size in landscape orientation. The vertical dimension h of the image size is larger than three times of the vertical dimension H of the output size, but smaller than four times thereof. In this state, if the user gives a command to start printing, for example, the image is printed separately onto four sheets of paper in single-sided printing.

In the state of (A) of FIG. 19, when the user makes a rotate gesture as represented in the region 61 by a couple of filled circles and the curved-arrow extending from one of the circles, the orientation of the image is changed, and the image size is also reduced. The processing result is shown as a preview image 92 of (B) of FIG. 19.

As known from the comparison between (A) of FIG. 19 and (B) of FIG. 19, the image size shown as the preview image 92 of (B) of FIG. 19 is reduced in such a manner that the vertical dimension h of the image size is made equal to the vertical dimension H of the output size. The horizontal dimension w of the image size is larger than the horizontal dimension W of the output size, but smaller than twice thereof. In this state, if the user gives a command to start printing, for example, the image is printed separately onto two sheets of paper in single-sided printing.

In the state of (B) of FIG. 19, when the user gives a command to further reduce the image size via pinch-in or double-tap, the image size is reduced in such a manner that the horizontal dimension w is made equal to the horizontal dimension W as with the case of the transition from (B) to (C) of FIG. 10.

Figure 20:
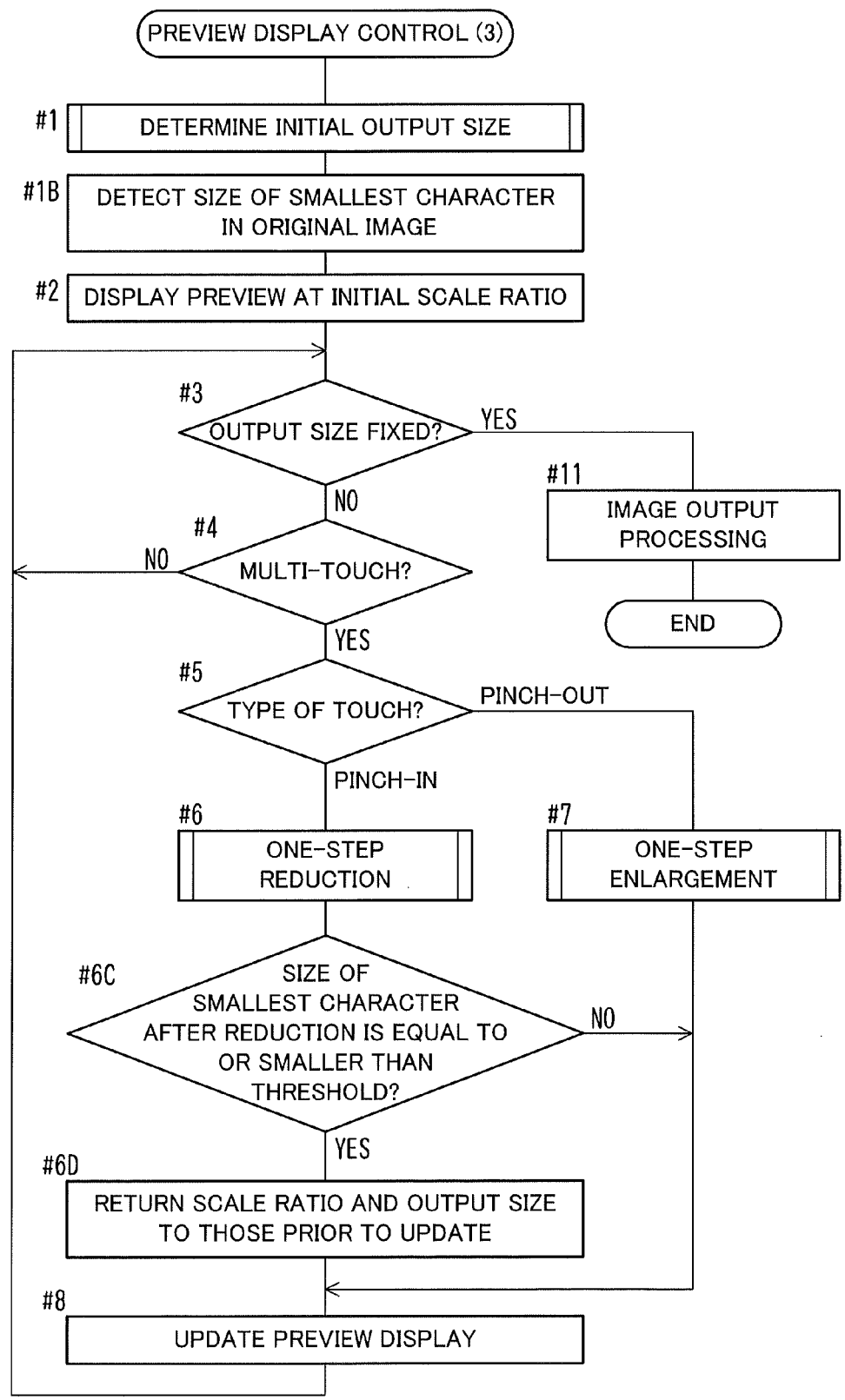
FIG. 20 is a flowchart depicting a third example of preview display control.

FIG. 20 is a flowchart depicting a third example of the preview display control executed by the previewer 110. In the third example, excess reduction is prevented. In the flowchart of FIG. 20, processing that is common to that in the flowchart of FIG. 12 is identified with the identical step numbers. The description on the processing according to the third example is provided, focusing on the processing different from that in FIG. 12.

The previewer 110 determines the initial output size in Step #1, and then detects the size of smallest character contained in the output target image (Step #1B). In the case where the image corresponds to a page of a document containing text data, the size of smallest character can be extracted from data describing contents of the document. In the case where the image corresponds to a raster image such as a scan image, character recognition technology is used to extract characters, and the size of the extracted characters is determined. In order to reduce the processing load, the detection of the size of smallest character may be made only for the case where meta data specifying the character size is accompanied with the image.

If pinch-in is made in a state where a preview image is displayed, the magnification setting portion 112 executes an one-step reduction routine (Steps #5 and #6). The magnification setting portion 112 determines the post-reduction size of the smallest character based on the scale ratio set in the one-step reduction routine and the size of smallest character detected in Step #1B, and compares the post-reduction size of the smallest character with a predetermined threshold (Step #6C).

If the post-reduction size of the smallest character is equal to or smaller than the threshold, then the magnification setting portion 112 returns the scale ratio updated in the one-step reduction routine to a scale ratio prior to the update (Step #6D). At this point in time, if the output size is previously changed through the one-step reduction routine, the output size is changed to the pre-change output size. As a result, the command for reduction given by the user becomes invalid.

According to the third example, it is possible to prevent the output of an image containing a character which has been reduced to an illegible level.

Figure 21:
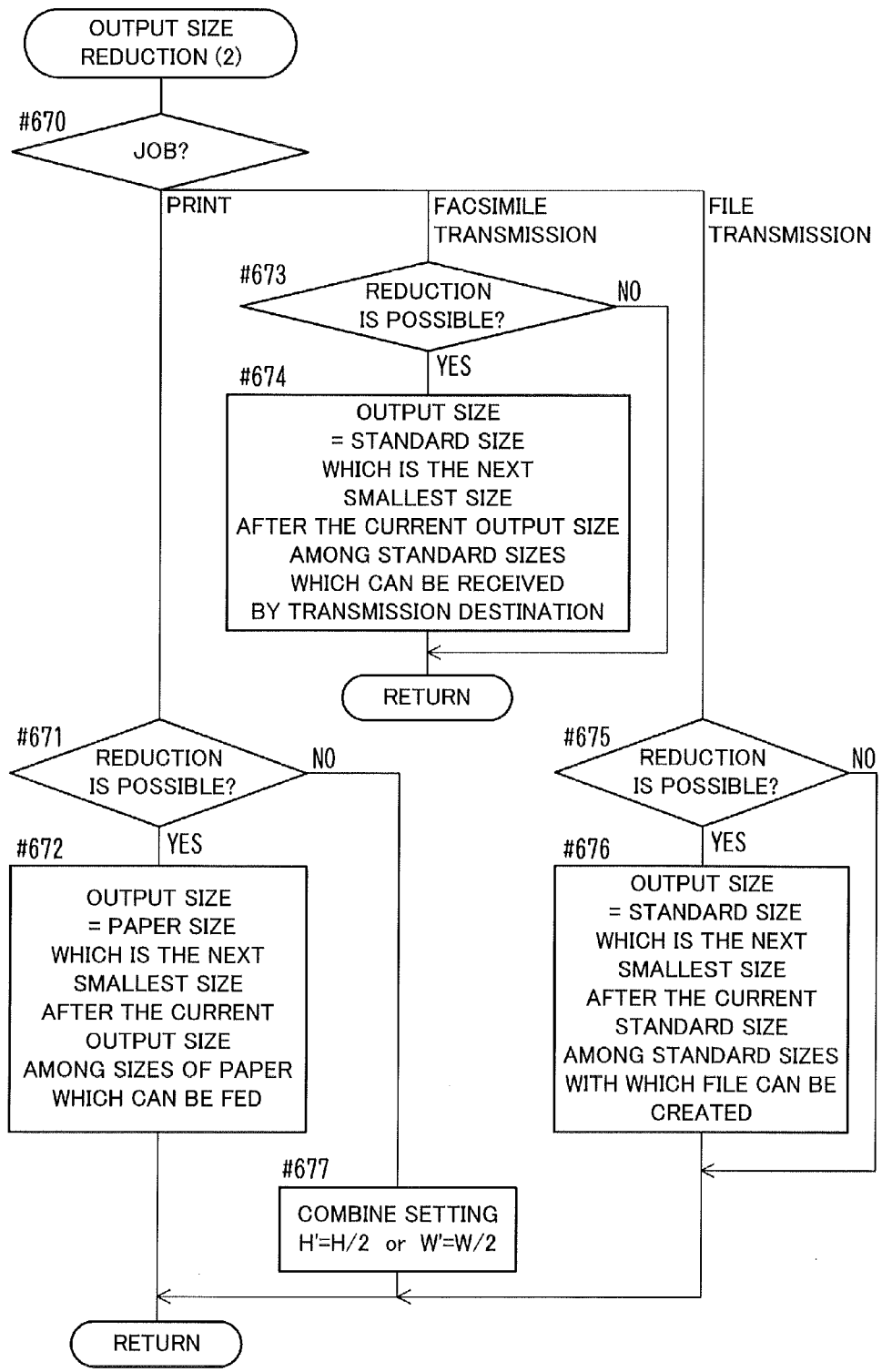
FIG. 21 is a flowchart depicting another example of an output size reduction subroutine.

FIG. 21 is a flowchart depicting a modified example of the output size reduction subroutine of FIG. 15. In the flowchart of FIG. 21, processing that is common to that in the flowchart of FIG. 15 is identified with the identical step numbers. The description on the processing according to the second example of the output size reduction subroutine is provided, focusing on the processing different from that in FIG. 15.

When the job checked in Step #670 is a print job, the magnification setting portion 112 checks whether or not it is possible to reduce the output size (Step #671). If the current output size corresponds to a paper size which is the smallest in size of sheets of paper loaded in the paper stacker 25, then it is determined that it is not possible to reduce the output size.

If it is determined that it is not possible to reduce the output size (No in Step #671), then the magnification setting portion 112 performs combine setting (Step #677). The combine setting is processing of setting the output size used for calculation of a scale ratio at a size having a half of the long side dimension according to the current output size. To be specific, if the orientation of the current output page corresponds to landscape orientation, then the horizontal dimension W is changed to a half of the current output size. If the orientation of the current output size corresponds to portrait orientation, then the vertical dimension H is changed to a half of the current output size. However, the output size set in the combine setting is a temporary size to set a scale ratio in order to further reduce the image size. The output size applied to actually output an image is an output size set before the combine setting is performed.

When the combine setting is performed through the output size reduction subroutine, the vertical dimension H and the horizontal dimension W obtained in the combine setting are applied to calculate a scale ratio in Steps #68-#70 of FIG. 14. The preview display is updated in Step #8 of FIG. 12 in such a manner that the image size reduced based on the calculated scale ratio is displayed. Therefore, the preview display of an N-in-1 printing for combining 2 pages into 1 page is provided as shown in FIG. 22.

Figure 22:
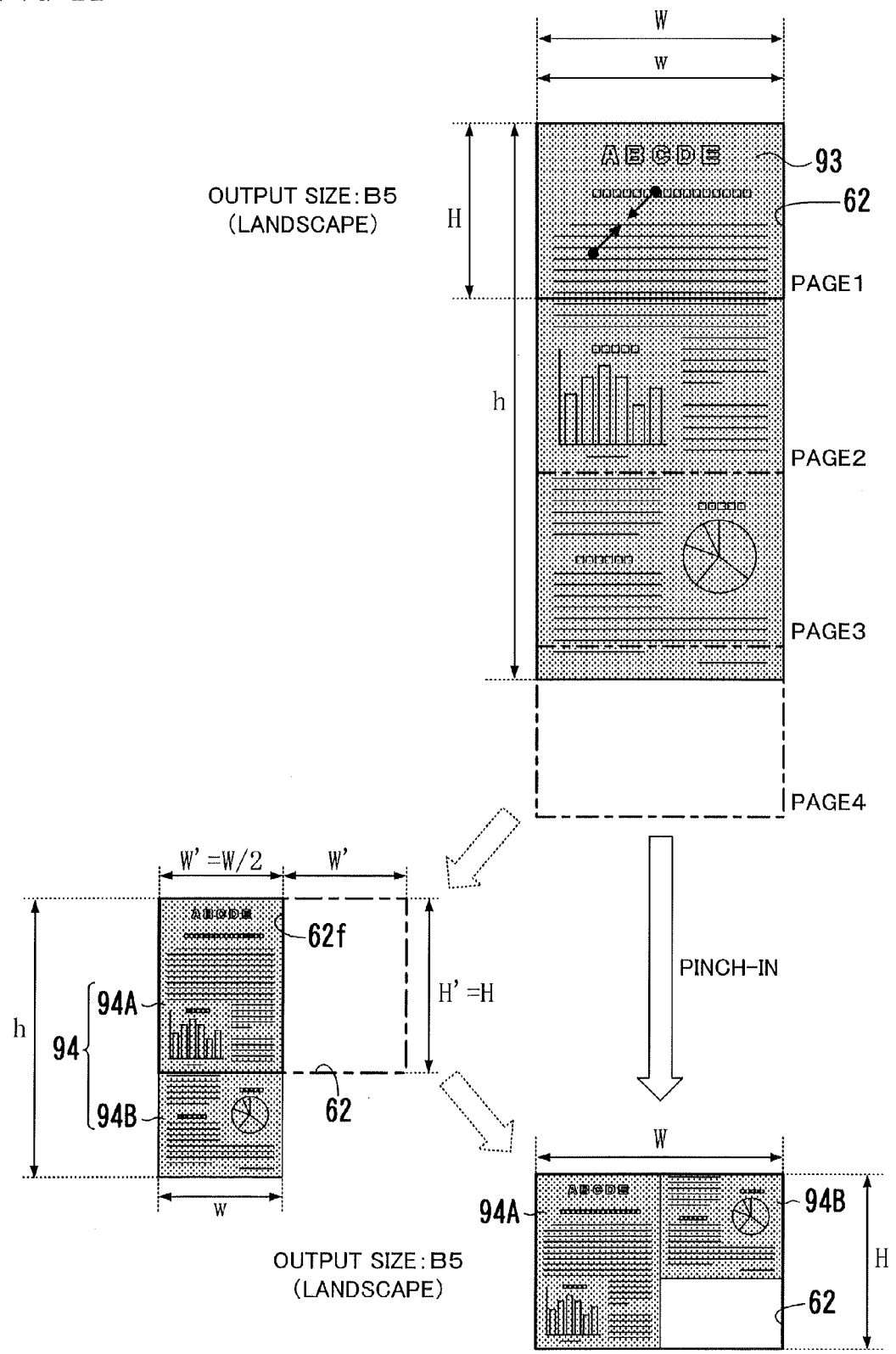
FIG. 22 is a diagram showing an example of reduction in image size through combine setting.

FIG. 22 is a diagram showing an example of reduction in image size through combine setting.

In FIG. 22, the horizontal dimension w of the image size represented as a preview image 93 conforms to the horizontal dimension W of the output size represented by a region 62. The vertical dimension h of the image size is much longer than the vertical dimension H of the output size. The output size is B5 size which is the smallest in size of sheets of paper indicated in the paper cassettes table Tp. The orientation of the output page corresponds to landscape orientation.

In a state where the preview image 93 is displayed, when operation for giving a command for reduction (pinch-in in this example) is performed, the combine setting is performed. To be specific, a virtual output size having a horizontal dimension W' is set. The horizontal dimension W' is a half of the horizontal dimension W, i.e., W'=W/2, which is the dimension of the long side of the output size in landscape orientation currently set. In FIG. 22, the virtual output size is shown as a region 62f.

After the combine setting, a scale ratio for reducing the image size is calculated in such a manner that at least one of the vertical dimension h and the horizontal dimension w is made equal to any one of the vertical dimension H' and the horizontal dimension W' of the virtual output size. The image size is reduced based on the scale ratio calculated. In FIG. 22, the reduced image size is represented as a preview image 94. In the illustrated example, the horizontal dimension w of the reduced image size conforms to the horizontal dimension W' of the virtual output size.

The vertical dimension h of the preview image 94 representing the image size is longer than the vertical dimension H' of the virtual output size. The preview image 94 includes a part 94A fitting into the region 62f representing the virtual output size and a part 94B extending beyond the region 62f. When the user makes a pinch-in gesture in a state where the preview image 93 is displayed, in the updated preview display, the two parts 94A and 94B of the preview image 94 are laid out side by side in the region 62 representing the actual output size.

According to the foregoing embodiments, an operational environment is implemented in which an image size of an output image can be quickly set at a size fitting into any one of standard sizes with multi-touch gestures, and the number of settable image sizes is greater than the number of standard sizes.

In the foregoing embodiments, for scaling an image size, a scale ratio determined based on a vertical dimension ratio between an image size and an output size and a horizontal dimension ratio therebetween is set. Thereby, a space provided for an image to be laid out on an output page can be minimized. It is possible to provide a registered scale ratio table Tm as shown in FIG. 23, register scale ratios thereinto, and use only the registered scale ratios for enlargement/reduction.

Choices of the standard size for printing are not limited to the examples in this description. The choices depend on the specifications of the paper stacker 25 and depend on which size of paper is loaded into the paper stacker 25.

In the foregoing embodiments, the example is taken in which the output size is changed to a size smaller than the initial output size (for reduction) or to a size greater than the initial output size depending on the type of scaling. However, the present invention is not limited thereto. All of selectable standard sizes may be used as choices of post-change sizes.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. An output setting device for setting a scale ratio for image size change for a case where an image is reduced or enlarged to be placed in an output page, the device comprising:
    a touch-sensitive panel capable of detecting a multi-touch;
    a setting portion configured to set, when a multi-touch gesture for giving a command to change an image size of the image is made on the touch-sensitive panel, as the scale ratio for image size change, a scale ratio closest to a present scale ratio from among scale ratios available for a case where the image is reduced or enlarged in accordance with the multi-touch gesture in such a manner that at least one of a vertical dimension and a horizontal dimension of the image size is made equal to any one of a vertical dimension and a horizontal dimension of any one of standard sizes with an aspect ratio of the image remaining unchanged;
    a display; and
    a display control portion configured to control the display to display a size relationship between the image size of the image and an output size that is a size of the output page,
    wherein:
        only when the multi-touch gesture is made in a state where the display displays the size relationship, the setting portion sets the scale ratio for image size change in accordance with the multi-touch gesture;

when the multi-touch gesture for giving a reduction command is made in a state where it is impossible to reduce the image size so as to fit into a smallest standard size among the standard sizes with an aspect ratio of the image remaining unchanged, the setting portion sets the scale ratio for image size change in such a manner that at least one of a vertical dimension and a horizontal dimension is made equal between the image size and a half size of the smallest standard size; and the display control portion controls the display to display, in an output page having the smallest standard size, an image in which an image region having a post-reduction image size based on the scale ratio for image size change set by the setting portion is divided into parts and change the relative positions of the parts such that the parts are placed side-by-side in response to the multi-touch gesture for giving a reduction command.

2. The output setting device according to claim 1, wherein, when the setting portion sets the scale ratio for image size change, the display control portion sets, as the output size, a standard size in which at least one of a vertical dimension and a horizontal dimension conforms to at least one of a vertical dimension and a horizontal dimension of a post-change image size that has been subjected to a change based on a post-update scale ratio, and controls the display to update indication on the display in such a manner that a size relationship between the post-change image size and the output size set is displayed.

3. The output setting device according to claim 1, wherein
when a change instructed through the multi-touch gesture is reduction, the setting portion sets the scale ratio for image size change in such a manner that the image size fits into a standard size, among the standard sizes, equal to or smaller than a present output size, and
when a change instructed through the multi-touch gesture is enlargement, the setting portion sets the scale ratio for image size change in such a manner that the image size fits into a standard size, among the standard sizes, equal to or greater than the present output size.

4. The output setting device according to claim 1, wherein, every time when double-tap is made after the multi-touch gesture, the setting portion sets the scale ratio for image size change under conditions that a command for a change identical to a change through the multi-touch gesture is given.

5. The output setting device according to claim 1, wherein, when a touch gesture for giving a command to change orientation of the image is made, the setting portion sets the scale ratio for image size change with orientation of the image and orientation of the output page fixed in such a manner that the output page and the image whose orientation has been changed are equal to each other in orientation of short sides and orientation of long sides.

6. The output setting device according to claim 1, further comprising a detection portion configured to detect a character size of a character included in the image; wherein
the setting portion sets the scale ratio for image size change in such a manner that a smallest character size of the character size detected by the detection portion is not be equal to or smaller than a set size.

7. The output setting device according to claim 1, wherein
the output setting device is provided in an image forming apparatus for printing the image onto any one of sheets of paper having different sizes, and producing a printed output, and
the setting portion sets the scale ratio for image size change with paper sizes of the sheets of paper as the standard sizes.

8. The output setting device according to claim 7, wherein an initial size of the output page is a paper size of paper fed from a priority paper feeding portion of paper feeding portions for supplying paper to a printer engine printing the image.

9. The output setting device according to claim 1, wherein
the output setting device is provided in an information device for outputting the image to a transmission destination through facsimile communication, and
the setting portion sets the scale ratio for image size change with page sizes usable in the transmission destination as the standard sizes.

10. A non-transitory computer-readable storage medium storing thereon a computer program used in a computer, the computer program being implemented for a case where an image is reduced or enlarged to be placed in an output page, the computer program causing the computer to perform processing comprising: setting processing for setting, when a multi-touch gesture for giving a command to change an image size of the image is made on a touch-sensitive panel, as a scale ratio for image size change, a scale ratio closest to a present scale ratio from among scale ratios available for a case where the image is reduced or enlarged in accordance with a command given through the multi-touch gesture in such a manner that at least one of a vertical dimension and a horizontal dimension of the image size is made equal to any one of a vertical dimension and a horizontal dimension of any one of standard sizes with an aspect ratio of the image remaining unchanged, wherein:
the computer program causes the computer to further perform display control processing for controlling a display to display a size relationship between the image size of the image and an output size that is a size of the output page;
only when the multi-touch gesture is made in a state where the display displays the size relationship, the setting processing includes setting the scale ratio for image size change in accordance with the multi-touch gesture;
when the multi-touch gesture for giving a reduction command is made in a state where it is impossible to reduce the image size so as to fit into a smallest standard size among the standard sizes with an aspect ratio of the image remaining unchanged, the setting processing includes setting the scale ratio for image size change in such a manner that at least one of a vertical dimension and a horizontal dimension is made equal between the image size and a half size of the smallest standard size; and
the display control processing includes controlling the display to display, in an output page having the smallest standard size, an image in which an image region having a post-reduction image size based on the set scale ratio for image size change is divided into parts and change the relative positions of the parts such that the parts are placed side-by-side in response to the multi-touch gesture for giving a reduction command.

11. The non-transitory computer-readable storage medium according to claim 10, wherein, when the scale ratio for image size change is set in the setting processing, the display control processing includes setting, as the output size, a standard size in which at least one of a vertical dimension and a horizontal dimension conforms to at least one of a vertical dimension and a horizontal dimension of a post-change image size that has been subjected to a change based on a post-update scale ratio, and controlling the display to update indication on the display in such a manner that a size relationship between the post-change image size and the output size set is displayed.

12. The non-transitory computer-readable storage medium according to claim 10, wherein
when a change instructed through the multi-touch gesture is reduction, the setting processing includes setting the scale ratio for image size change in such a manner that the image size fits into a standard size, among the standard sizes, equal to or smaller than a present output size, and
when a change instructed through the multi-touch gesture is enlargement, the setting processing includes setting the scale ratio for image size change in such a manner that the image size fits into a standard size, among the standard sizes, equal to or greater than the present output size.

13. The non-transitory computer-readable storage medium according to claim 10, wherein, every time when double-tap is made after the multi-touch gesture, the setting processing includes setting the scale ratio for image size change under conditions that a command for a change identical to a change through the multi-touch gesture is given.

14. The non-transitory computer-readable storage medium according to claim 10, wherein, when a touch gesture for giving a command to change orientation of the image is made, the setting processing includes setting the scale ratio for image size change with orientation of the image and orientation of the output page fixed in such a manner that the output page and the image whose orientation has been changed are equal to each other in orientation of short sides and orientation of long sides.

15. The non-transitory computer-readable storage medium according to claim 10, wherein
the computer program causes the computer to further perform detection processing for detecting a character size of a character included in the image, and
the setting processing includes setting the scale ratio for image size change in such a manner that a smallest character size of the character size detected in the detection processing is not be equal to or smaller than a set size.

16. The non-transitory computer-readable storage medium according to claim 10, wherein, when the image is printed onto any one of sheets of paper having different sizes and a printed output is produced, the setting processing includes setting the scale ratio for image size change with paper sizes of the sheets of paper as the standard sizes.

17. The non-transitory computer-readable storage medium according to claim 16, wherein an initial size of the output page is a paper size of paper fed from a priority paper feeding portion of paper feeding portions for supplying paper to a printer engine printing the image.

18. The non-transitory computer-readable storage medium according to claim 10, wherein, when the image is outputted to a transmission destination through facsimile communication, the setting processing includes setting the scale ratio for image size change with page sizes usable in the transmission destination as the standard sizes.

* * * * *